(12) United States Patent
Tsuzaki et al.

(10) Patent No.: US 8,164,577 B2
(45) Date of Patent: Apr. 24, 2012

(54) INPUT DEVICE, CONTROL METHOD OF INPUT DEVICE, AND PROGRAM

(75) Inventors: Ryoichi Tsuzaki, Kanagawa (JP); Tomoya Narita, Kanagawa (JP); Kazunori Yamaguchi, Kanagawa (JP); Tsutomu Harada, Kanagawa (JP); Mitsuru Tateuchi, Kanagawa (JP)

(73) Assignee: Sony Corporation, Tokyo (JP)

(*) Notice: Subject to any disclaimer, the term of this patent is extended or adjusted under 35 U.S.C. 154(b) by 774 days.

(21) Appl. No.: 12/259,750

(22) Filed: Oct. 28, 2008

(65) Prior Publication Data

US 2009/0122007 A1     May 14, 2009

(30) Foreign Application Priority Data

Nov. 9, 2007   (JP) ................................ 2007-291575

(51) Int. Cl.
    G06F 3/02           (2006.01)
    G06F 3/041          (2006.01)

(52) U.S. Cl. ........................................................ 345/173

(58) Field of Classification Search .................. 715/702; 345/175, 173; 382/195

See application file for complete search history.

(56) References Cited

U.S. PATENT DOCUMENTS

| | | | | |
|---|---|---|---|---|
| 6,249,606 B1 * | 6/2001 | Kiraly et al. | ................. | 382/195 |
| 7,190,336 B2 | 3/2007 | Fujisawa | | |
| 7,734,622 B1 * | 6/2010 | Fitzhugh | .................... | 707/722 |
| 7,777,501 B2 * | 8/2010 | Reynolds et al. | ............. | 324/678 |
| 7,812,826 B2 * | 10/2010 | Ording et al. | ................. | 345/173 |
| 2006/0026521 A1 * | 2/2006 | Hotelling et al. | ............. | 715/702 |
| 2007/0247435 A1 * | 10/2007 | Benko et al. | ................. | 345/173 |

FOREIGN PATENT DOCUMENTS

| | | | |
|---|---|---|---|
| JP | 2-153415 | | 6/1990 |
| JP | 1990-153415 A | * | 6/1990 |
| JP | 6-12177 | | 1/1994 |
| JP | 10-269022 | | 10/1998 |
| JP | 2000-19478 | | 1/2000 |
| JP | 2001-175375 | | 6/2001 |
| JP | 2003-280812 | | 10/2003 |
| JP | 2004-127272 | | 4/2004 |
| JP | 2004-303000 | | 10/2004 |
| JP | 2005-339444 | | 12/2005 |
| JP | 2006-31499 | | 2/2006 |
| JP | 2007-52497 | | 3/2007 |
| JP | 2007-266902 | | 10/2007 |
| WO | WO 2006/003591 A2 | | 1/2006 |
| WO | WO 2006/003591 A3 | | 1/2006 |
| WO | WO 2007/079425 A2 | | 7/2007 |

OTHER PUBLICATIONS

Office Action issued Apr. 12, 2011, in Japanese Patent Application No. 2007-291575.

* cited by examiner

*Primary Examiner* — Quan-Zhen Wang
*Assistant Examiner* — Michael J Eurice
(74) *Attorney, Agent, or Firm* — Oblon, Spivak, McClelland, Maier & Neustadt, L.L.P.

(57) ABSTRACT

Disclosed herein is an input device including, a target creating section a performing section, and a height information generating section wherein the target creating section generates the information on the target to which information the height information is added, and the performing section performs predetermined processing on a basis of the height information added to the information on the target.

10 Claims, 24 Drawing Sheets

FIG. 15

```
                 FRAME NUMBER    NUMBER OF TARGETS    NUMBER OF EVENTS
<IODisplay>
  <Info frameNumber="22" numOfTargets="2" numOfEvents="1" />
                                     NUMBER OF FRAME OF FIRST INPUT
  <Targets>
                                                             REGION INFORMATION
    <tid="0" ft="0" x="10" y="20" z="10" a="100" rt="5" rb="25" rl="5" rr="15" />
         TARGET ID      REPRESENTATIVE  HEIGHT
                        COORDINATES     INFORMATION  AREA INFORMATION
  </Targets>
  <Targets>
    <tid="1" ft="2" x="30" y="40" z="0" a="200" rt="30" rb="50" rl="25" rr="35" />
  </Targets>
  <Events>
                                                          NUMBER OF PIECES
                                                          OF ADDITIONAL
                                                          INFORMATION
    <eid="1" fn="22" type="Rotate" numOfID="2" numOfValue="3" >
                                             NUMBER OF TARGETS
                                             WHOSE STATES ARE
                                             INDICATED BY EVENTS
      <tid="0" />  TARGET ID OF
      <tid="1" />  TARGET WHOSE STATE IS
                   INDICATED BY EVENT
      <extra ex="20"/>
      <extra ex="30"/>  ADDITIONAL
      <extra ex="20"/>  INFORMATION
    </e>
  </Events>
</IODisplay>
```

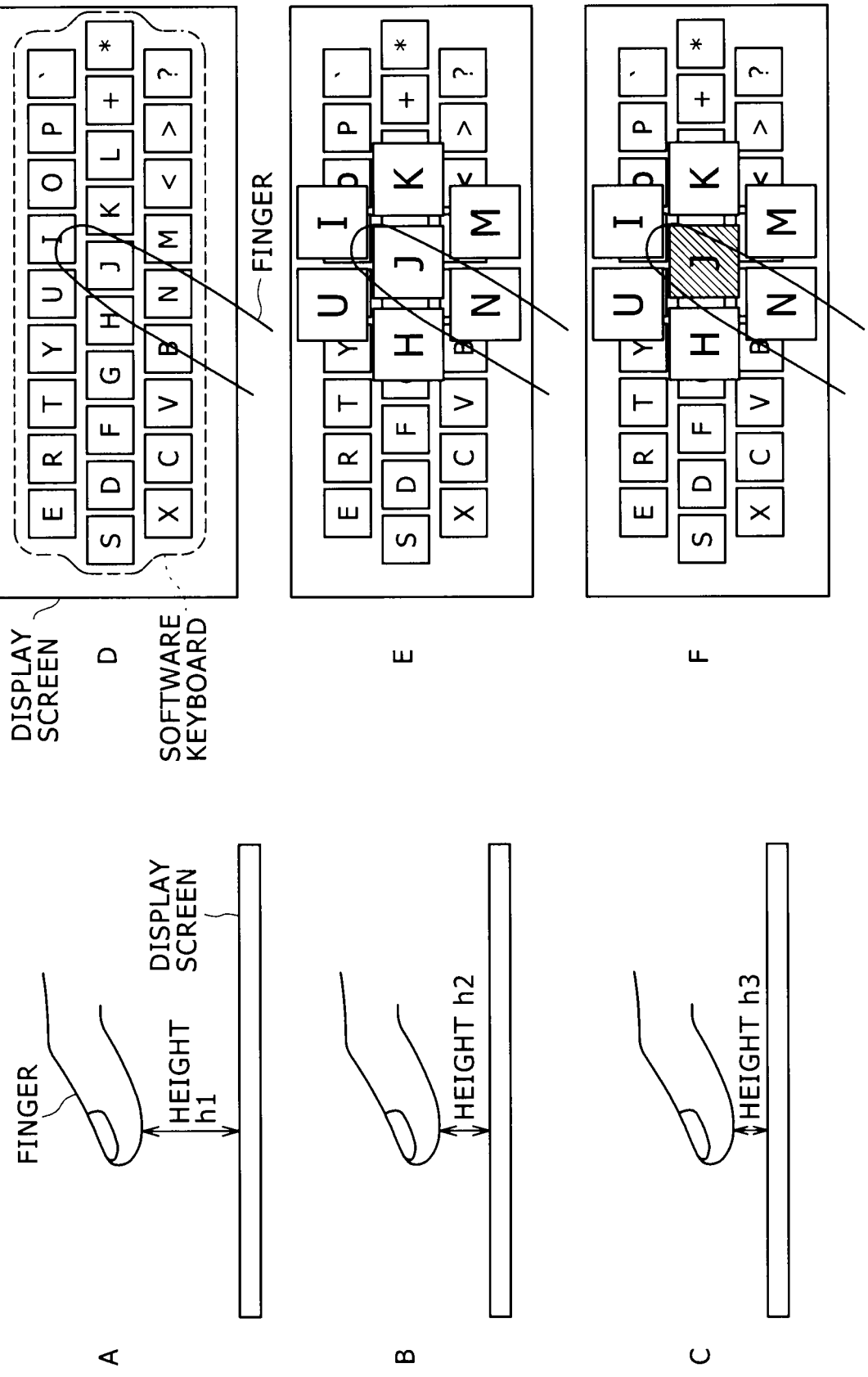

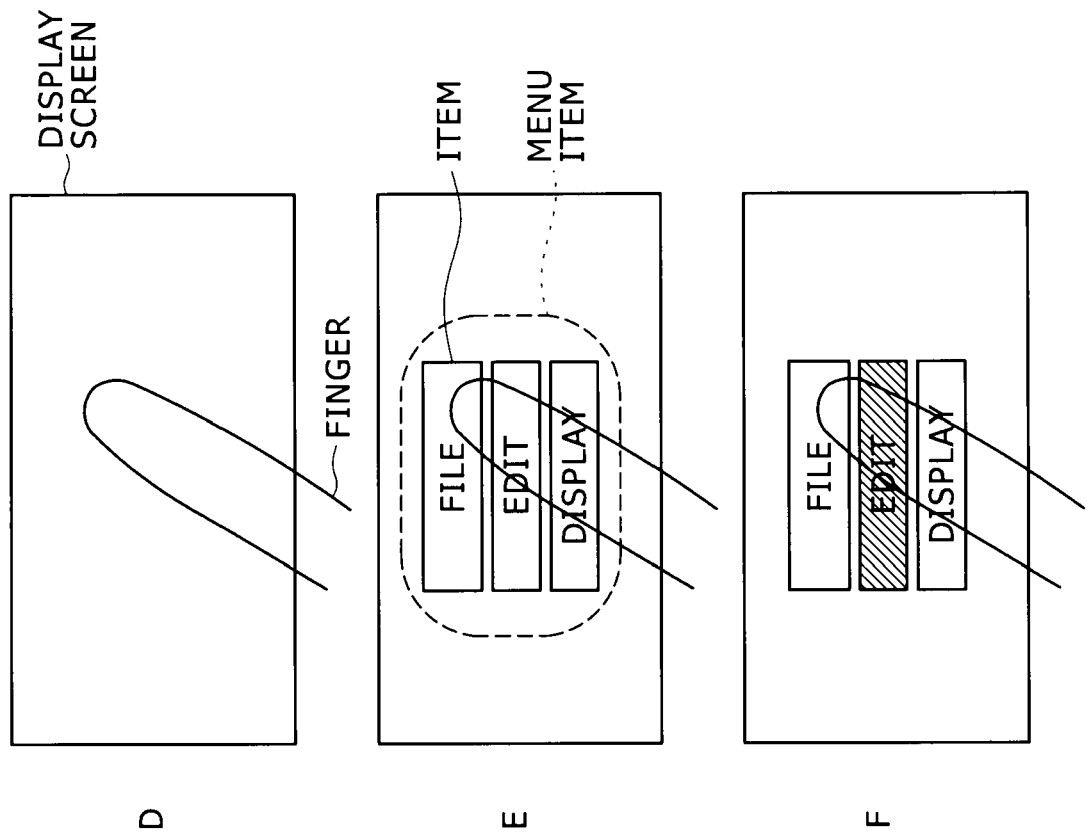
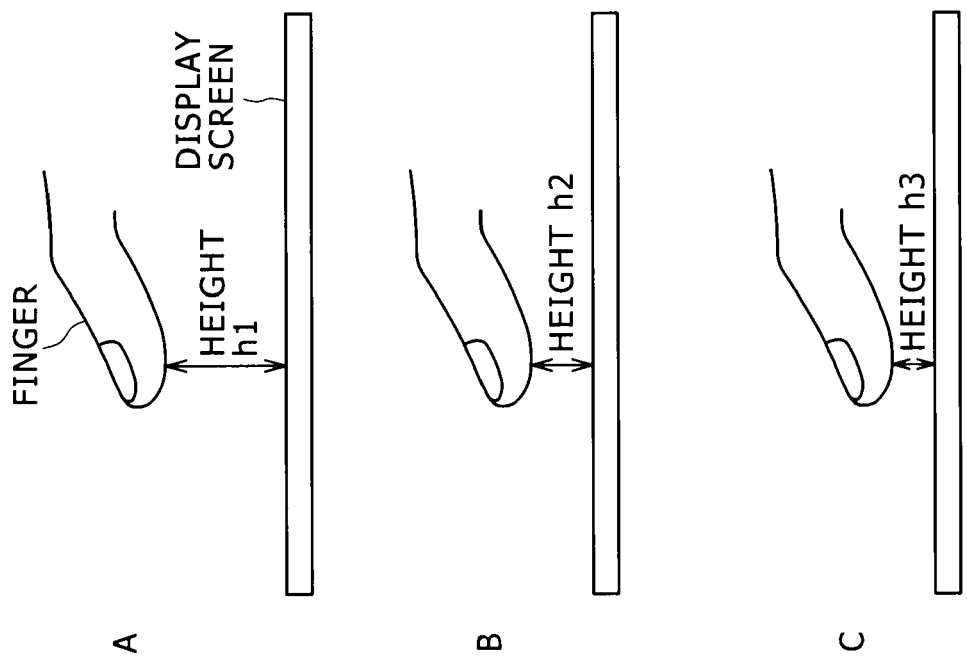
FIG.18

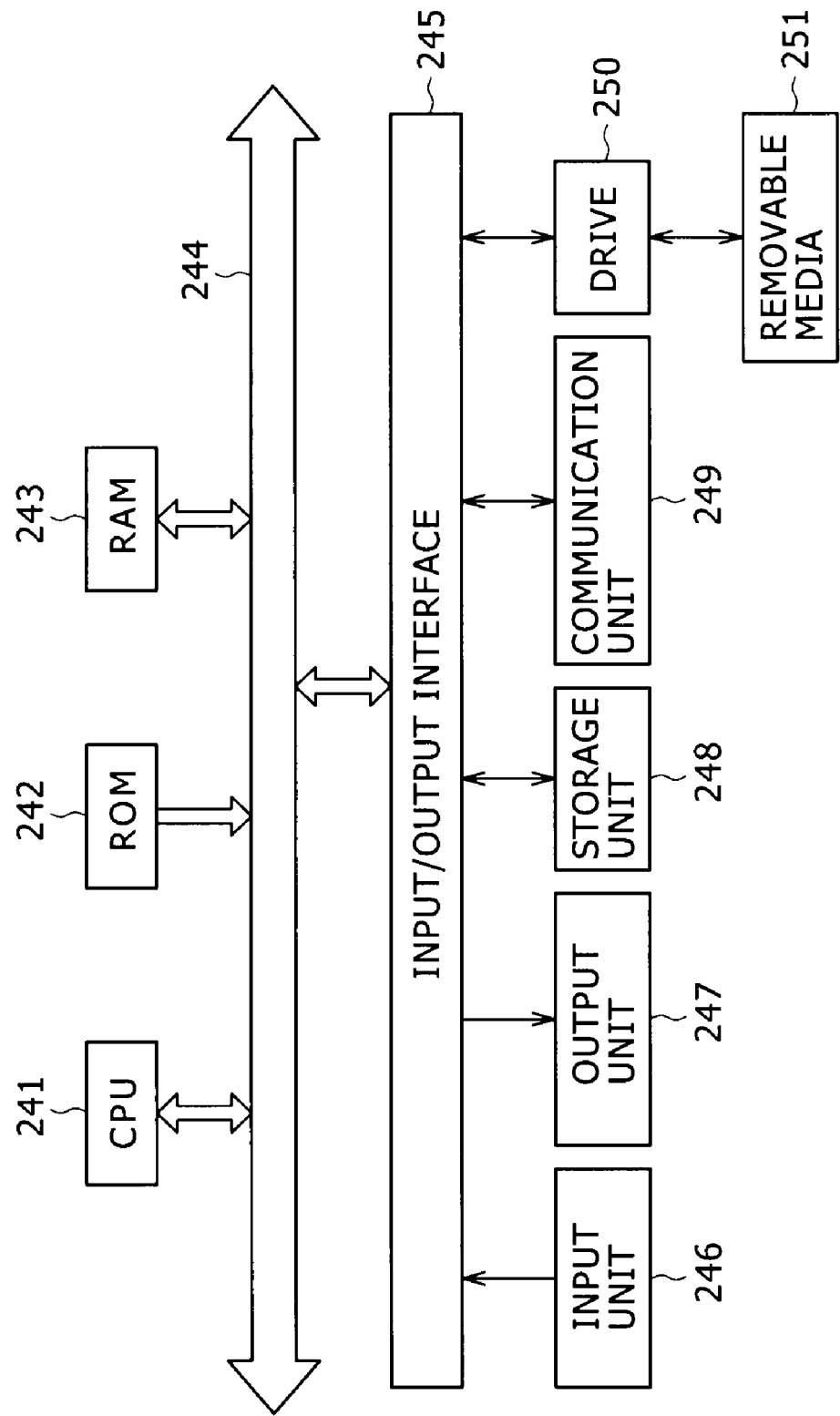

INPUT DEVICE, CONTROL METHOD OF INPUT DEVICE, AND PROGRAM

CROSS REFERENCES TO RELATED APPLICATIONS

The present invention contains subject matter related to Japanese Patent Application JP 2007-291575 filed in the Japan Patent Office on Nov. 9, 2007, the entire contents of which being incorporated herein by reference.

BACKGROUND OF THE INVENTION

1. Field of the Invention

The present invention relates to an input device, a control method of the input device, and a program, and particularly to an input device, a control method of the input device, and a program that for example enable a higher-level application or the like to use height information on height from a display screen of an external input performed by bringing an object close to the display screen.

2. Description of the Related Art

As a panel that can output information on a plurality of points on the panel, for example, a display panel has been proposed which includes an optical sensor in a liquid crystal display device and detects input of external light by the optical sensor, thereby enabling input by light (the display panel will hereinafter be referred to as an input-output panel) (see Japanese Patent Laid-Open No. 2000-019478 and Japanese Patent Laid-Open No. 2004-127272).

Methods of performing input by light on an input-output panel are roughly divided into methods using light incident on a liquid crystal display device from an external light source such as an LED (Light Emitting Diode) or the like as a result of a user bringing an object (such as a pen) having the external light source close to the display screen of the liquid crystal display device and methods using light emitted by a liquid crystal display device, that is, the transmitted light of the backlight of the liquid crystal display device which light is reflected by an object such as a finger, a pen or the like without such an external light source which object is coming close to the display screen, and then returned to the inside of the liquid crystal display device as a result of a user bringing the object close to the display screen.

In addition, a touch panel of a pressure-sensitive type or the like outputs point information as information on a point on the touch panel (which information is for example the coordinates of the point) at which point an external input is performed. However, the point information can be output for only one point.

Specifically, for example, even when a user brings fingers or the like close to two points on the touch panel, the touch panel outputs point information on only one of the two points to which point a stronger pressure is applied or which point is touched first, for example.

On the other hand, the input-output panel can output point information on a plurality of points, and is thus expected to be applied in the future to products and the like to which the touch panel of the related art has been applied.

SUMMARY OF THE INVENTION

However, the above-described input-output panel does not output height information indicating height from the display screen of an external input performed by bringing an object close to the display screen. Therefore a higher-level application or the like cannot use the height information.

The present invention has been made in view of such a situation, and for example enables a higher-level application or the like to use height information on height from a display screen of an external input performed by bringing an object close to the display screen.

According to an embodiment of the present invention, there is provided an input device having an input unit for receiving light corresponding to an external input, and allowing input to a plurality of points on an input surface of the input unit, the input device including: target creating means for generating information on a target indicating a series of external inputs on a basis of temporal or spatial positional relation of input parts to which the inputs have been performed; performing means for performing predetermined processing on a basis of the information on the target; and height information generating means for generating height information indicating height of the target from the input surface on a basis of an amount of light received in the input unit; wherein the target creating means generates the information on the target to which information the height information is added, and the performing means performs predetermined processing on a basis of the height information added to the information on the target.

An input device according to an embodiment of the present invention further includes event creating means for recognizing an event indicating a change in state of the target on a basis of the information on the target, and generating information on the event, wherein the performing means performs predetermined processing on a basis of the information on the event.

A control method of an input device or a program according to an embodiment of the present invention is a control method of an input device or a program for making a computer perform control processing of an input device, the input device having an input unit for receiving light corresponding to an external input, and allowing input to a plurality of points on an input surface of the input unit, the control method or the program including the steps of: generating information on a target indicating a series of external inputs on a basis of temporal or spatial positional relation of input parts to which the inputs have been performed; performing predetermined processing on a basis of the information on the target; and generating height information indicating height of the target from the input surface on a basis of an amount of light received in the input unit; wherein in a process of the target creating step, the information on the target to which information the height information is added is generated, and in a process of the performing step, predetermined processing is performed on a basis of the height information added to the information on the target.

In an embodiment of the present invention, information on a target indicating a series of external inputs is generated on a basis of temporal or spatial positional relation of input parts to which the inputs have been performed, predetermined processing is performed on a basis of the information on the target, height information indicating height of the target from the input surface is generated on a basis of an amount of light received in the input unit, in generating the information on the target, the information on the target to which information the height information is added is generated, and in performing the predetermined processing, the predetermined processing is performed on a basis of the height information added to the information on the target.

According to an embodiment of the present invention, for example, a higher-level application or the like can use height information on height from a display screen of an external input performed by bringing an object into proximity to the display screen.

BRIEF DESCRIPTION OF THE DRAWINGS

FIG. 15 is a diagram showing an example of target and event information output from the generating section to the control unit;

FIGS. 16A, 16B, 16C, 16D, 16E, and 16F are diagrams showing an example of processing performed by the portable telephone according to the height of a finger;

FIGS. 18A, 18B, 18C, 18D, 18E, and 18F are diagrams showing another example of processing performed by the portable telephone according to the height of a finger;

FIG. 24 is a block diagram showing an example of configuration of hardware of a computer to which the present invention is applied.

DETAILED DESCRIPTION OF THE PREFERRED EMBODIMENTS

Preferred embodiments of the present invention will hereinafter be described. Correspondences between constitutional requirements of the present invention and embodiments described in the specification or the drawings are illustrated as follows. This description is to confirm that embodiments supporting the present invention are described in the specification or the drawings. Therefore, even when there is an embodiment described in the specification or a drawing but not described here as an embodiment corresponding to a constitutional requirement of the present invention, it does not signify that the embodiment does not correspond to the constitutional requirement. Conversely, even when an embodiment is described here as corresponding to a constitutional requirement, it does not signify that the embodiment does not correspond to constitutional requirements other than that constitutional requirement.

Preferred embodiments of the present invention will hereinafter be described with reference to the drawings.

Figure 1:
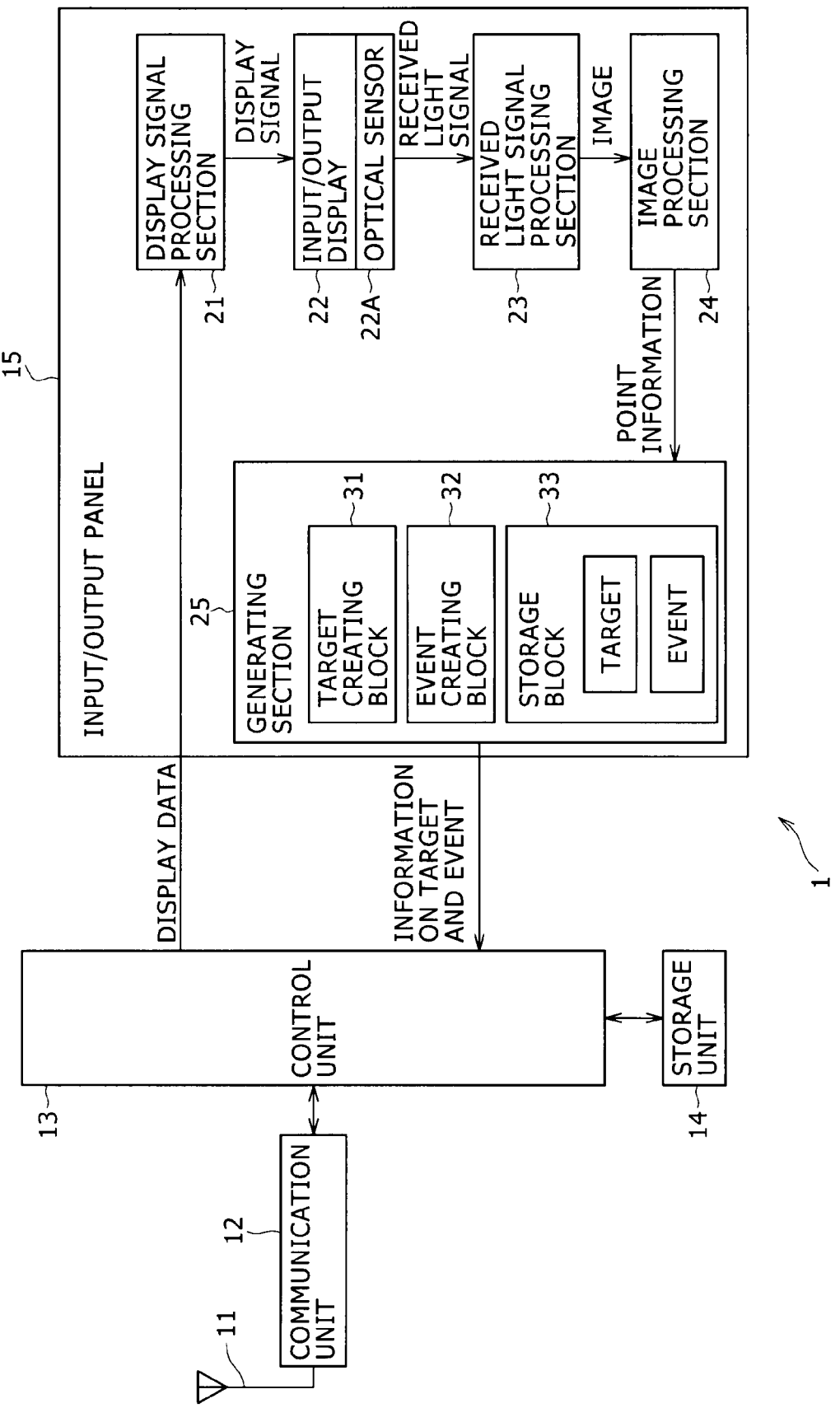
FIG. 1 is a block diagram showing an example of configuration of a portable telephone.

FIG. 1 is a block diagram showing an example of configuration of a portable telephone to which an embodiment of the present invention is applied.

For example, when a user performs input by bringing an object such as a finger into proximity to (bringing the object into contact with or separating the object at only a short distance from) a display screen of the portable telephone 1 (display screen of an input-output display 22 in the example of FIG. 1), the portable telephone 1 for example performs a predetermined process according to the height of the object such as the finger or the like from the display screen.

For example, according to the height, the portable telephone 1 displays a part of a plurality of keys of a software keyboard displayed on the display screen in an enlarged state, or selects one key of the part of the keys and inputs information corresponding to the key.

The portable telephone 1 includes an antenna 11, a communication unit 12, a control unit 13, a storage unit 14, and an input-output panel 15.

The antenna 11 supplies a signal corresponding to a radio wave from a base station not shown in the figure to the communication unit 12, and radiates (transmits) a radio wave corresponding to a signal supplied from the communication unit 12 to the base station.

The communication unit 12 performs radio communication with the base station by transmitting and receiving a signal of a predetermined frequency to and from the base station via the antenna 11, for example.

The control unit 13 for example includes a microprocessor, a RAM (Random Access Memory), and a ROM (Read Only Memory). The control unit 13 performs control of each part of the portable telephone 1 and the like by loading a program stored in the storage unit 14 into the RAM and executing the program.

For example, the control unit 13 performs a predetermined process of for example inputting predetermined information or controlling display of the input-output display 22 on the basis of information on an input part as described above, information on a target, and the like, which information is supplied from the input-output panel 15.

The storage unit 14 is for example formed by a flash memory, a hard disk or the like. The storage unit 14 stores a program, data and the like in advance.

The input-output panel 15 makes display of an image on the input-output display 22, that is, for example makes OSD (On Screen Display) of a software keyboard or the like on the basis of display data supplied from the control unit 13.

The input-output panel 15 also generates information on a target to be described later or the like by subjecting information on an input part detected from a received light signal output from the input-output display 22 to a predetermined process. The input-output panel 15 supplies the information on the target or the like to the control unit 13.

The input-output panel 15 includes a display signal processing section 21, the input-output display 22, a received light signal processing section 23, an image processing section 24, and a generating section 25.

The display signal processing section 21 subjects display data supplied from the control unit 13 to predetermined processing, and supplies a display signal obtained as a result of the processing to the input-output display 22.

The input-output display 22 makes OSD display or the like on the display screen thereof on the basis of the display signal supplied from the display signal processing section 21.

In addition, the input-output display 22 for example includes a plurality of optical sensors 22A distributed throughout the display screen thereof. The input-output display 22 receives light made incident so as to correspond to an external input, generates a received light signal of each frame which signal corresponds to the amount of the received light, and then supplies the received light signal to the received light signal processing section 23. Incidentally, description in the following will be made supposing that the light made incident so as to correspond to an external input is for example light reflected and returned by a finger in proximity to the display screen after being emitted from the input-output display 22.

The received light signal processing section 23 for example subjects the received light signal supplied from the input-output display 22 to received light signal processing such as amplification, filter processing and the like. The received light signal processing section 23 thereby obtains, for each frame, an image in which luminance differs between a part to which a finger or the like is in proximity and a part to which nothing is in proximity on the display screen of the input-output display 22. The received light signal processing section 23 then supplies the image to the image processing section 24.

The image processing section 24 subjects the image of each frame which image is supplied from the received light signal processing section 23 to image processing such as binarization, noise removal, labeling and the like. The image processing section 24 thereby detects a part (region) to which a finger or the like is in proximity on the display screen as an input part. For example, the image processing section 24 detects a part of high luminance in the image after the image processing as an input part. Then, the image processing section 24 generates information on the detected input part, that is, for example point information as a predetermined feature quantity of the input part for each frame. The image processing section 24 supplies the point information to the generating section 25.

Figure 2:
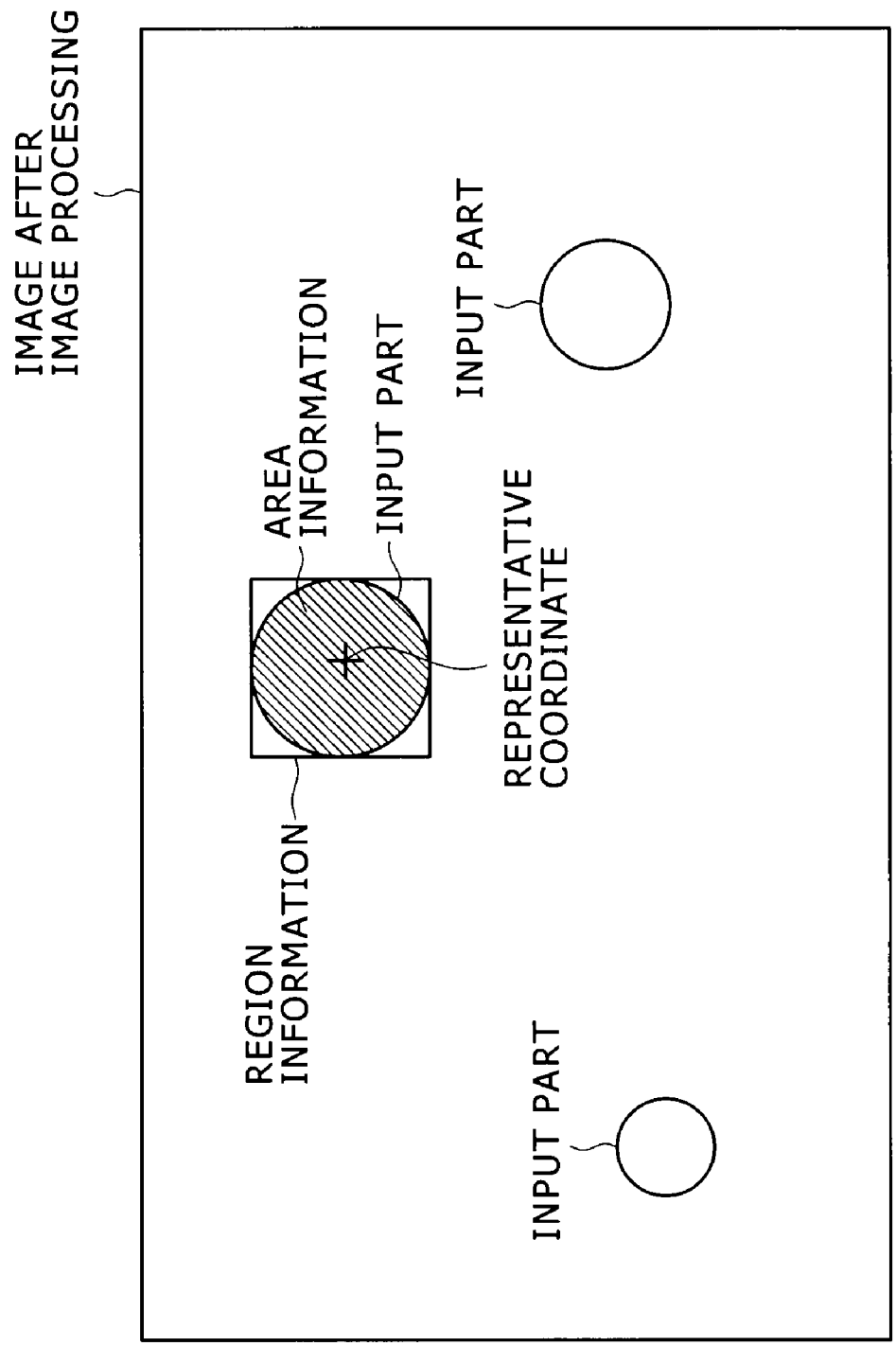
FIG. 2 is a diagram showing an example of feature quantities of input parts which feature quantities are calculated as point information.

For example, as shown in FIG. 2, adoptable as the feature quantity of the input part which feature quantity is calculated as the point information are representative coordinates as coordinates of a representative point of the region of the input part (for example a hatched part in the figure) (that is, the region to which a finger or the like is in proximity on the display screen of the input-output display 22) in the image after the image processing, the representative point being the center, the barycenter or the like of the region, area information as information on the area of the region, and region information indicating the range of the region, such as a coordinate of an upper end, a coordinate of a lower end, a coordinate of a left end, and a coordinate of a right end of a minimum rectangle enclosing the region.

The generating section 25 generates information on a target and an event for each frame on the basis of the point information supplied from the image processing section 24. The generating section 25 supplies the information to the control unit 13.

A target is for example a series of inputs performed to the display screen of the input-output display 22 in a period from bringing for example a finger into proximity to the display screen of the input-output display 22 to moving the finger while the finger is kept in proximity to the display screen to stopping keeping the finger in proximity to the display screen.

An event for example indicates a change in state of a target, such as a change in position of the target, appearance (creation) of the new target, disappearance (deletion) of the target, or the like.

Incidentally, details of information on a target and an event will be described later with reference to FIG. 11 and the like.

The generating section 25 includes a target creating block 31, an event creating block 32, and a storage block 33.

The target creating block 31 subjects the point information of the input part in each frame which point information is supplied from the image processing section 24 to predetermined processing, and thereby generates information on a target for each frame on the basis of temporal or spatial positional relation of the input part. The target creating block 31 stores the information on the target in the storage block 33. Incidentally, the information on the target is for example positional information or the like of the target.

The event creating block 32 subjects the point information of the input part in each frame which point information is supplied from the image processing section 24 to predetermined processing, and thereby detects an event such as creation, deletion or the like of a target as described above. The event creating block 32 generates information on the event, and stores the information on the event in the storage block 33 for each frame. Incidentally, the information on the event is for example the start time of the event, the type of the event, and the like.

Then, the event creating block 32 reads the information on the target and the event for each frame from the storage block 33, and supplies (outputs) the information to the control unit 13.

The storage block 33 stores the information on the target which information is supplied from the target creating block 31 and the information on the event which information is supplied from the event creating block 32.

Figure 3:
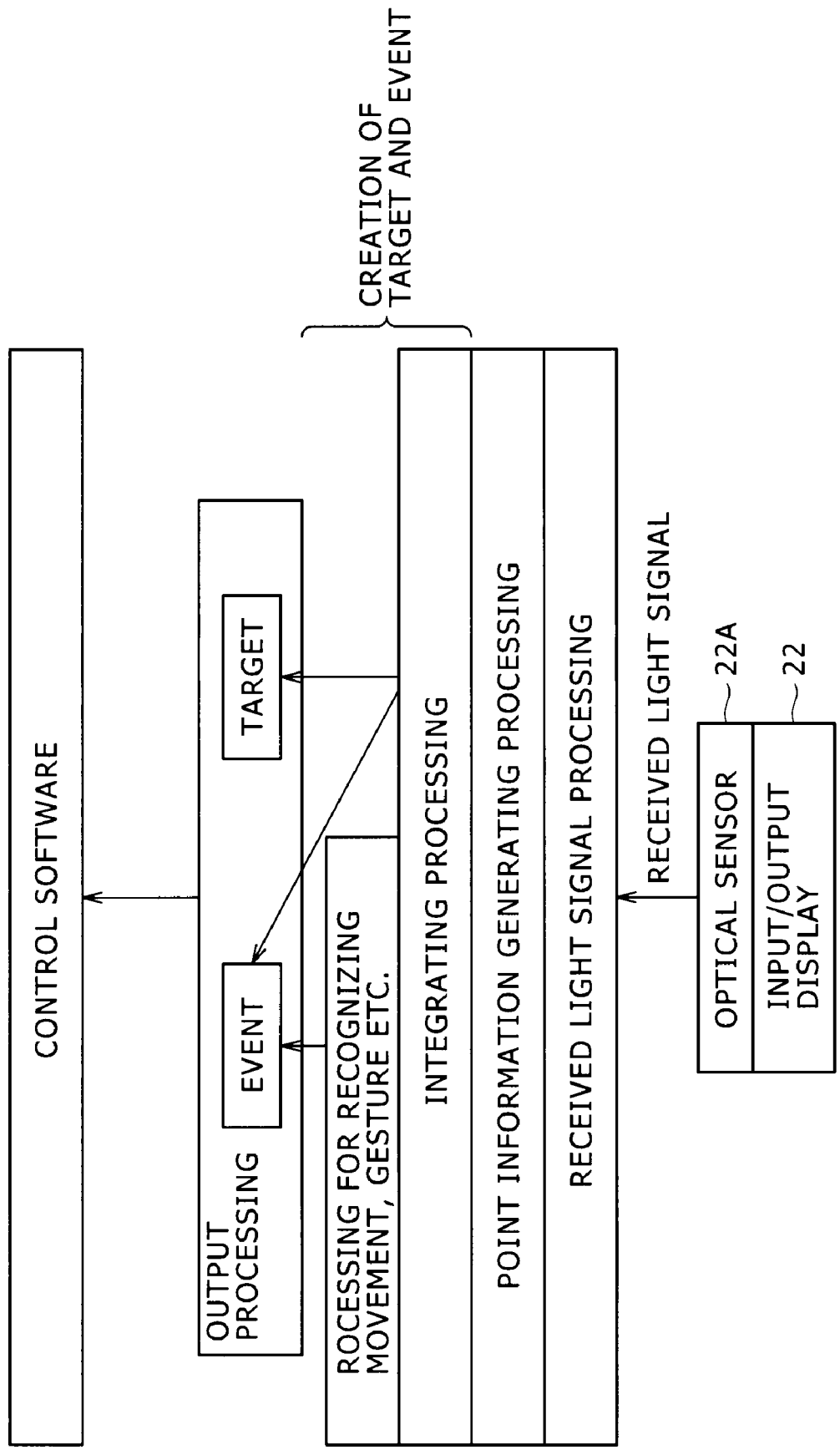
FIG. 3 is a diagram showing a group of pieces of software for making the portable telephone perform various processing.

FIG. 3 shows a group of pieces of software for making the portable telephone 1 of FIG. 1 perform various processing.

This software group includes software that performs received light signal processing, software that performs processing for generating point information, software that performs integrating processing, software that performs processing for recognizing a movement, a gesture and the like, software that performs output processing, and control software as a higher-level application.

The optical sensors 22A of the input-output display 22 in FIG. 3 receive externally incident light, and generate a received light signal for each frame.

In the layer of the received light signal processing, the received light signal of each frame which signal is supplied from the input-output display 22 is subjected to the received light signal processing such as amplification, filter processing and the like. Thereby an image of each frame corresponding to the received light signal is obtained.

In the layer of the point information generating processing higher by one level than the received light signal processing, the image obtained by the received light signal processing is subjected to predetermined image processing such as binarization, noise removal, labeling and the like. Thereby an input part as a part to which a finger or the like is in proximity on the display screen of the input-output display 22 is detected, and point information of the input part is generated for each frame.

In the layer of the integrating processing higher by one level than the point information generating processing, information on a target for each frame is generated and an event such as target creation or deletion is detected from the point information obtained by the point information generating processing, and information on the event is generated.

In the layer of the recognizing processing higher by one level than the integrating processing, a movement, a gesture or the like is recognized by detecting (recognizing) an event indicating a change in state of a target from the point information obtained by the point information generating processing, and information on the event is generated for each frame.

In the layer of the output processing higher by one level than the recognizing processing, the information on the target and the event which information is generated by the integrating processing and the recognizing processing is output for each frame.

In the layer of the control software as layer of an application higher by one level than the output processing, predetermined display data is created on the basis of the information on the target and the event which information is output by the output processing, and the display data is supplied to the input-output display 22, so that a software keyboard, for example, is displayed on the display screen of the input-output display 22.

Description will next be made of detection of height of an object in proximity such as a finger from the display screen by the portable telephone 1.

Utilizing a fact that the greater the height from the display screen of a finger or the like in proximity to the display screen, the smaller the amount of light reflected from the finger or the like and received by the optical sensors 22A, and the luminance value of an input part to which the finger or the like is in proximity in an image supplied from the received light signal processing section 23 to the image processing section 24 is correspondingly decreased, the portable telephone 1 can detect the height of the finger or the like on the basis of the amount of light received by the optical sensors 22A.

In order to detect the height of the finger or the like from the display screen, the binarization processing for detecting an input part by the image processing section 24, for example, is performed not only for one threshold value as in a normal case but is performed for each of a plurality of threshold values.

Figure 4:
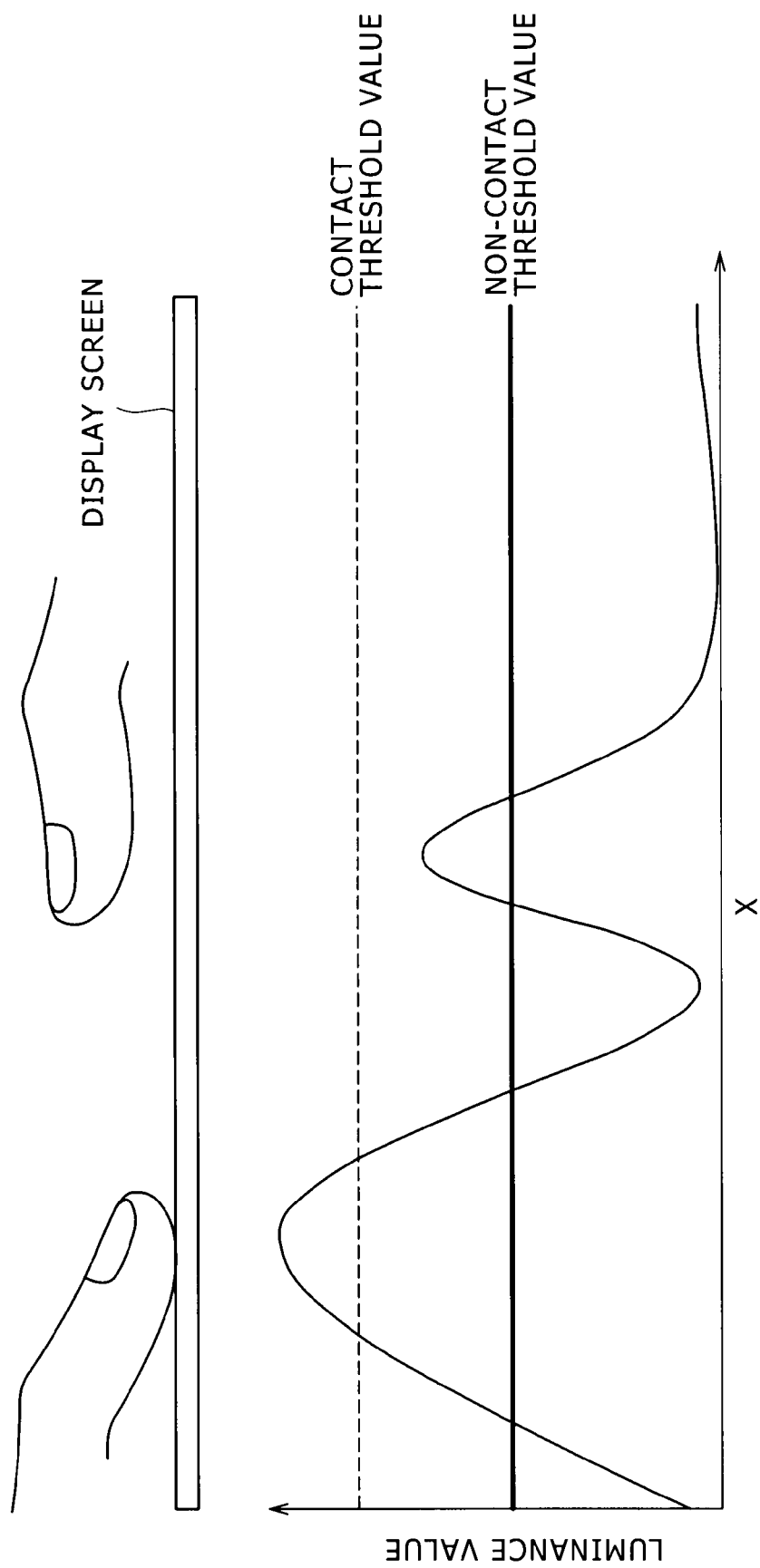
FIG. 4 is a diagram showing a state of detection of height of fingers which detection is performed using two threshold values.

Specifically, in the example of FIG. 4, a contact threshold value (broken line in the figure) for detecting contact of the finger or the like and a non-contact threshold value (thick line in the figure), which is lower than the contact threshold value, for detecting a so-called floating state in which the finger or the like is not in contact but is separated at a given distance are used.

Incidentally, in FIG. 4, an axis of ordinates indicates the luminance value of the image supplied from the received light signal processing section 23 to the image processing section 24, and an axis of abscissas indicates for example a position x in a horizontal direction on the display screen. Incidentally, the same is true for FIG. 5 to be described later.

In the example of FIG. 4, a region around a part that a left finger is in contact with in the figure is detected as an input part as a part on the display screen which part has a luminance value equal to or higher than the contact threshold value, and the contact of the left finger used for the input is detected. In addition, a region around a part that a right finger is in proximity to in the figure is detected as an input part as a part on the display screen which part has a luminance value equal to or higher than the non-contact threshold value and lower than the contact threshold value, and the floating state of the right finger used for the input is detected. Thus, when the two threshold values are used, two heights, which is a height 0 corresponding to a contact state and a predetermined positive height corresponding to a floating state, are detected as the height of the finger or the like.

Figure 5:
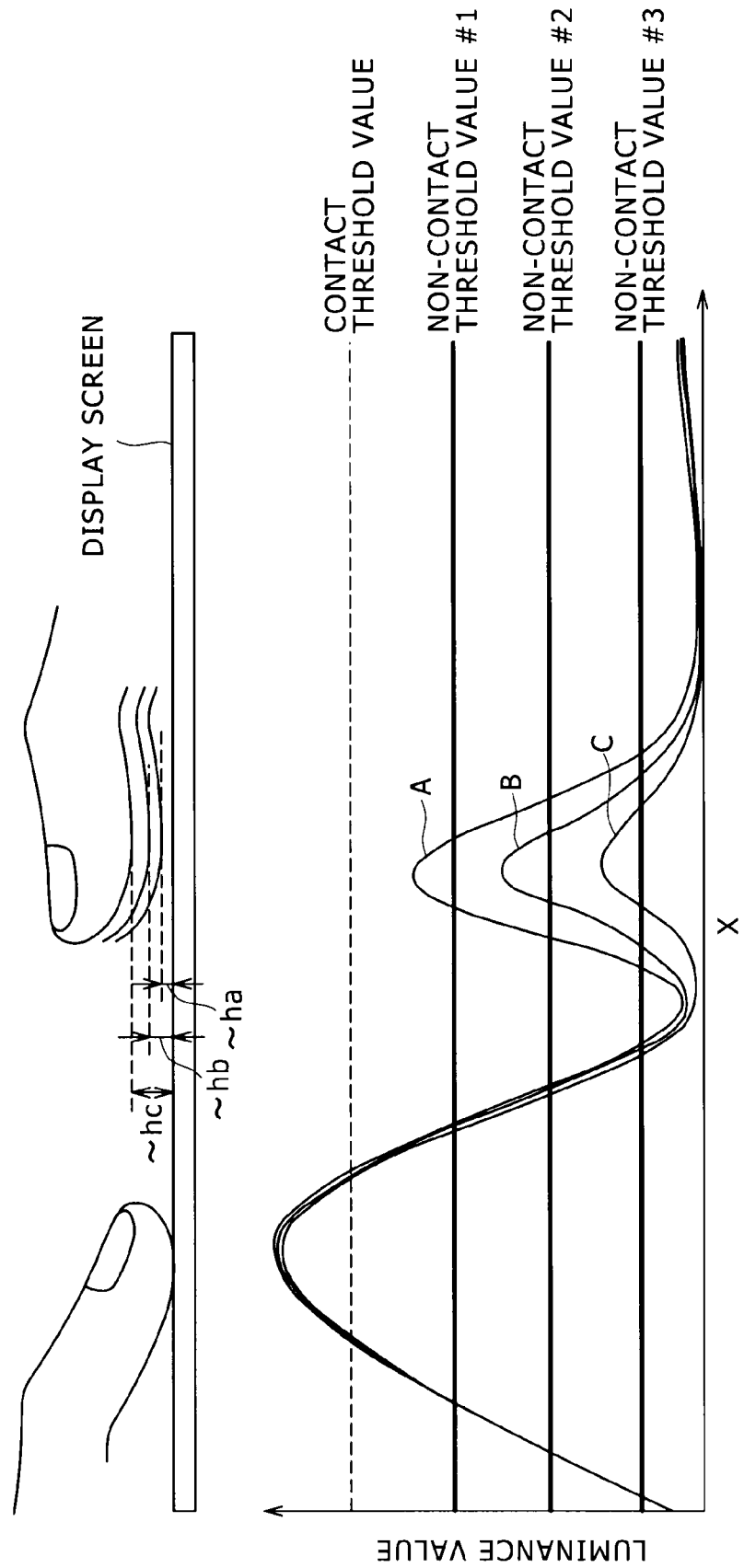
FIG. 5 is a diagram showing a state of detection of height of fingers which detection is performed using four threshold values.

In an example of FIG. 5, a contact threshold value (broken line in the figure) and three non-contact threshold values #1 to #3 (thick lines in the figure) are used. Incidentally, Contact Threshold Value>Threshold Value #1>Threshold Value #2>Threshold Value #3.

In the example of FIG. 5, a region around the left finger in the figure which finger is in contact at substantially a height 0 is detected as an input part as a part on the display screen which part has a luminance value equal to or higher than the contact threshold value, and the height of the left finger used for the input is detected as height 0, for example. In addition, a region around the right finger in the figure which finger is in proximity at about a height ha is detected as an input part as a part on the display screen which part has a luminance value equal to or higher than the non-contact threshold value #1 and lower than the contact threshold value, and the height of the right finger used for the input is detected as height ha, for example. A region around the right finger in the figure which finger is in proximity at about a height hb is detected as an input part as a part on the display screen which part has a luminance value equal to or higher than the non-contact threshold value #2 and lower than the non-contact threshold value #1, and the height of the right finger used for the input is detected as height hb, for example. A region around the right finger in the figure which finger is in proximity at about a height hc is detected as an input part as a part on the display screen which part has a luminance value equal to or higher than the non-contact threshold value #3 and lower than the non-contact threshold value #2, and the height of the right finger used for the input is detected as height hc, for example. Thus, when the four threshold values are used, the four heights 0, ha, hb, and hc are detected.

By thus increasing the number of threshold values used for the binarization processing, it is possible to increase the number of detected heights, and raise the resolution of the detected heights.

In order to perform such height detection, the image processing section 24 binarizes an image of each frame which image is supplied to the image processing section 24 using each threshold value, and subjects a resulting binary image to image processing such as noise removal, labeling and the like. Thereby, the image processing section 24 detects an input part for each threshold value, and once generates point information of the input part for each threshold value. Then, the image processing section 24 finally obtains point information of input parts for each frame which information is to be supplied to the generating section 25 from the point information of the input part for each threshold value, and adds height information to the point information.

For example, supposing that n threshold values are used for binarization, that the threshold values are a first to an nth threshold value in decreasing order, and that heights h1 to hn are detected in correspondence with the threshold values, the image processing section 24 compares the point information of an input part for the first threshold value with the point information of an input part for the second threshold value. When there is an input part for the first threshold value in the vicinity of the input part for the second threshold value, the image processing section 24 adds height information indicating a height h2 to the point information of the input part for the second threshold value, and sets the point information (to which the height information is added) of the input part for the second threshold value as point information of the input part for the first threshold value. When there is no input part for the first threshold value in the vicinity of the input part for the second threshold value, the image processing section 24 adds height information indicating the height h2 as the point information of the input part for the second threshold value.

Then, the image processing section 24 compares the point information of the input part for the second threshold value with the point information of an input part for the third threshold value. When there is an input part for the second threshold value in the vicinity of the input part for the third threshold value, the image processing section 24 sets the point information of the input part for the third threshold value as point information of the input part for the second threshold value. When there is no input part for the second threshold value in the vicinity of the input part for the third threshold value, the image processing section 24 adds height information indicating a height h3 to the point information of the input part for the third threshold value.

Similarly, the image processing section 24 compares the point information of an input part for the kth ($3 \leq k \leq n$) threshold value with the point information of an input part for the (k+1)th threshold value. When there is an input part for the kth threshold value in the vicinity of the input part for the (k+1)th threshold value, the image processing section 24 sets the point information of the input part for the (k+1)th threshold value as point information of the input part for the kth threshold value. When there is no input part for the kth threshold value in the vicinity of the input part for the (k+1)th threshold value, the image processing section 24 adds height information indicating a height h(k+1) to the input part for the (k+1)th threshold value.

Then, the image processing section 24 sets the point information (to which the height information is added) of the input part for the nth threshold value after the point information of the input part for the nth threshold value is subjected to the above-described processing as point information of the input part of this frame. The image processing section 24 finally supplies the point information to the generating section 25.

In addition, as described above, the portable telephone 1 handles a series of inputs by an object such as a finger in proximity to the display screen as a target, and can therefore handle the height of the finger or the like as the height of the target.

That is, the generating section 25 generates information on the target to which height information is added on the basis of point information to which the height information is added. Thus, information on the target and an event to which the height information is added is output to the control unit 13.

Incidentally, referring to FIGS. 6 to 14 in the following, description will be made of a case where height information is not added to point information supplied from the image processing section 24 to the generating section 25 for convenience of the description.

Figure 6:
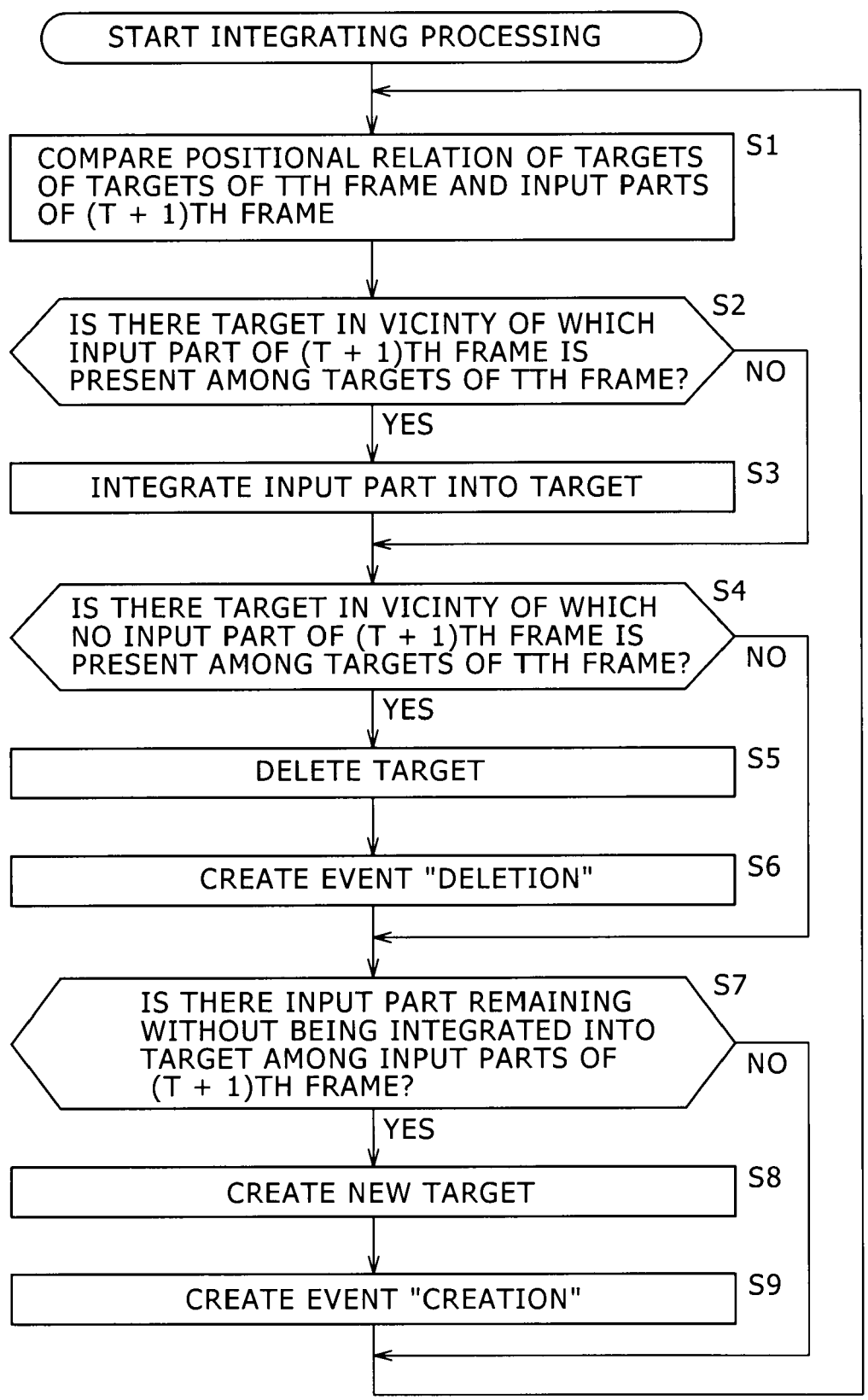
FIG. 6 is a diagram of assistance in explaining integrating processing by a generating section.

The integrating processing by the generating section 25 in FIG. 1 will next be described with reference to a flowchart of FIG. 6.

Incidentally, suppose that the integrating processing has already been performed on each of frames before a tth frame, and that the storage block 33 stores at least information on targets and events of the tth frame.

In step S1, when the target creating block 31 is for example supplied with point information of input parts of a (t+1)th frame from the image processing section 24, the target creating block 31 reads the information on the targets of the tth frame from the storage block 33, and compares positional relation of the targets of the tth frame and the input parts of the (t+1)th frame by comparing the representative coordinates of the targets of the tth frame with the representative coordinates of the input parts of the (t+1)th frame.

In step S2, the target creating block 31 determines whether there is a target in the vicinity of which an input part of the (t+1)th frame is present among the targets of the tth frame. When it is determined in step S2 that there is a target in the vicinity of which an input part of the (t+1)th frame is present among the targets of the tth frame, the target creating block 31 in step S3 determines that the input part in the vicinity of the target is the input part of a newest input to be added to a series of inputs as the target, and integrates (merges) the input part in the vicinity of the target into the target. Incidentally, when there are a plurality of input parts in the vicinity of the target, the target creating block 31 for example integrates an input part of the plurality of input parts which input part is closest to the target into the target.

Figure 7:
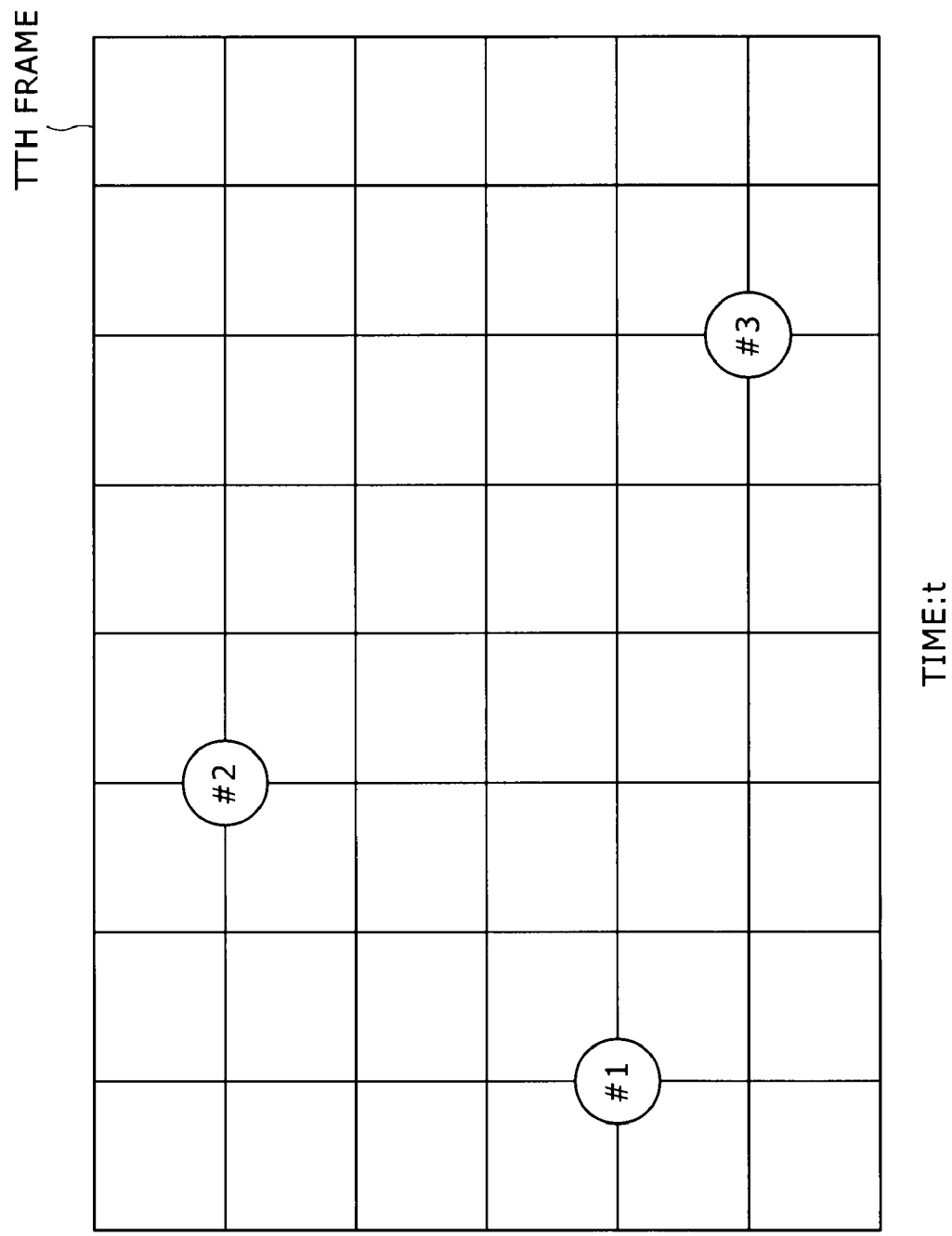
FIG. 7 is a diagram showing an example of targets of a tth frame.
Figure 8:
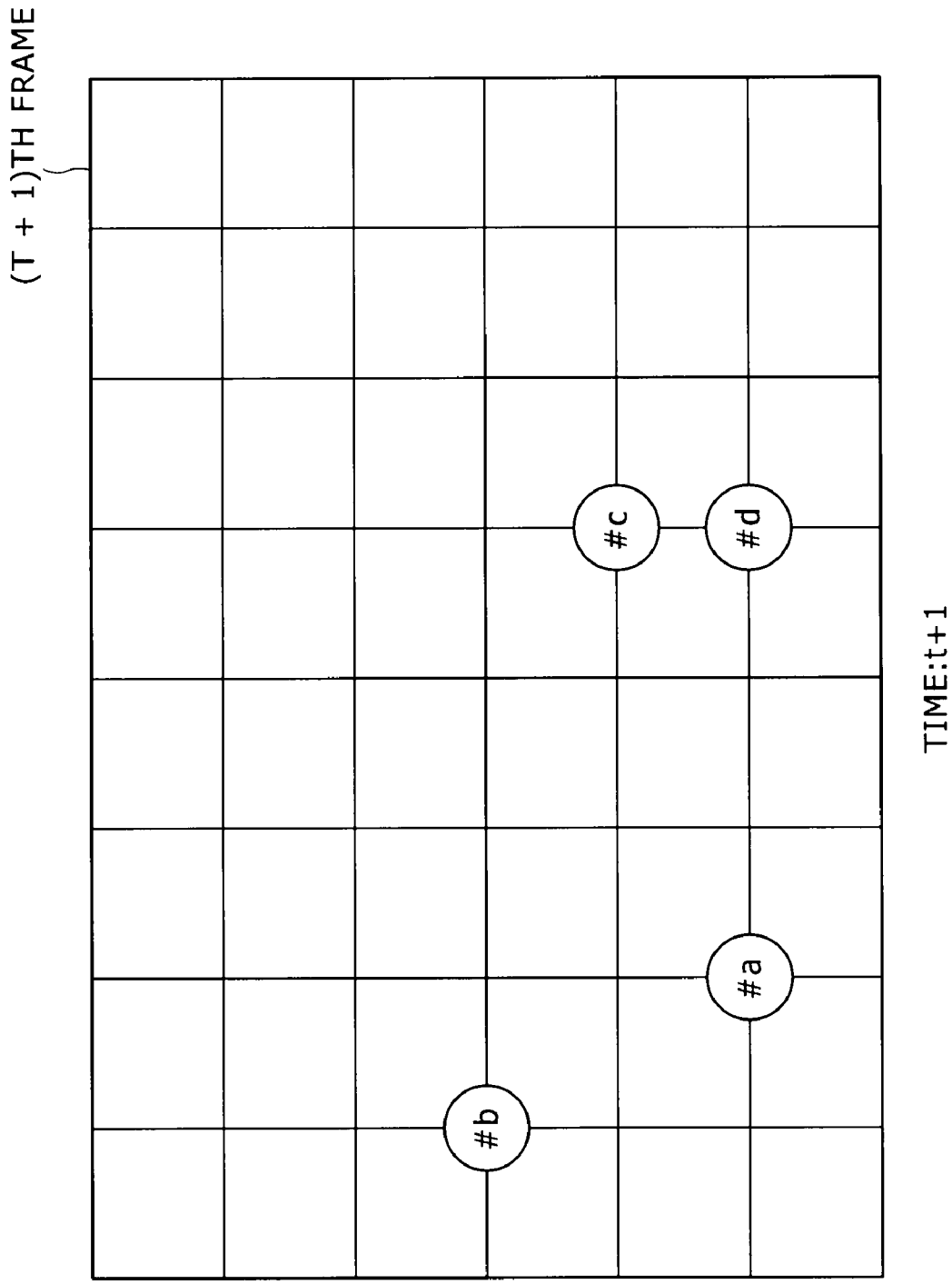
FIG. 8 is a diagram showing an example of input parts of a (t+1)th frame.
Figure 9:
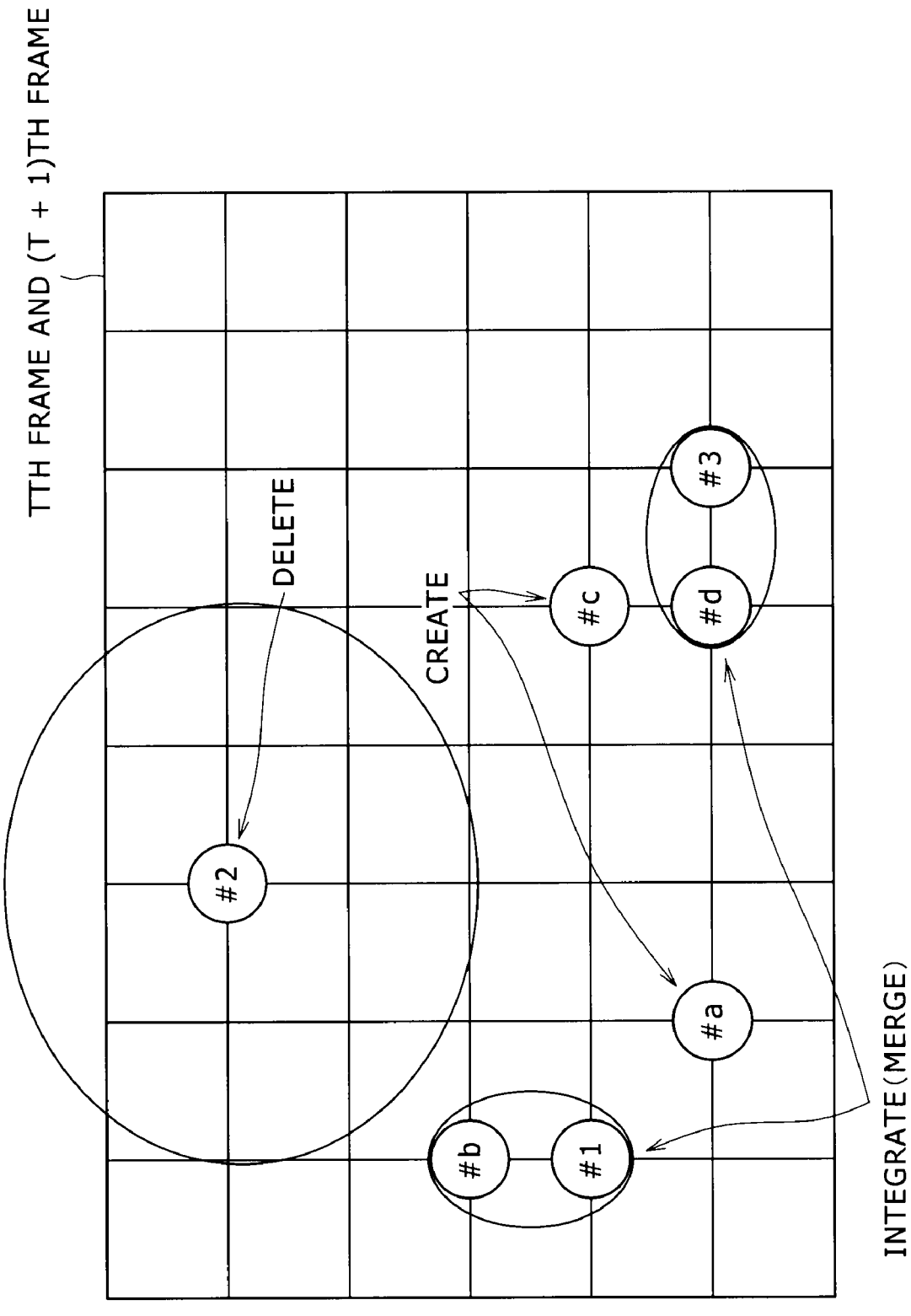
FIG. 9 is a diagram showing a state in which the targets of the tth frame in FIG. 5 are superimposed on the input parts of the (t+1)th frame in FIG. 6.

For example, in FIG. 9, which shows a state in which the targets #1 to #3 of the tth frame as shown in FIG. 7 are superimposed on the input parts #a to #d of the (t+1)th frame as shown in FIG. 8, the input parts #a and #b are present in the vicinity of the target #1. Because the input part #b is closer to the target #1 than the input part #a, the input part #b is integrated into the target #1. In addition, the input parts #c and #d are present in the vicinity of the target #3. Because the input part #d is closer to the target #3 than the input part #c, the input part #d is integrated into the target #3.

Incidentally, the frames shown in FIGS. 7 to 9 are provided with squares for convenience of description. The vicinity in this case refers to for example a range within a distance of two squares in the figures.

Returning to FIG. 6, when it is determined in step S2 that there is no target in the vicinity of which an input part of the (t+1)th frame is present among the targets of the tth frame, step S3 is skipped.

In step S4, the target creating block 31 determines whether there is a target in the vicinity of which no input part of the (t+1)th frame is present among the targets of the tth frame. When it is determined in step S4 that there is a target in the vicinity of which no input part of the (t+1)th frame is present among the targets of the tth frame, the target creating block 31 in step S5 determines that a series of inputs as the target is ended, and deletes the target.

For example, in FIG. 9, no input part is present in the vicinity of the target #2, and therefore the target #2 is deleted.

In step S6, the event creating block 32 creates an event "deletion" indicating that the target has been deleted.

Incidentally, when it is determined in step S4 that there is no target in the vicinity of which no input part of the (t+1)th frame is present among the targets of the tth frame, steps S5 and S6 are skipped.

In step S7, the target creating block 31 determines whether there is an input part remaining without being integrated into a target of the tth frame among the input parts of the (t+1)th frame. When it is determined in step S7 that there is an input part remaining without being integrated into a target of the tth frame among the input parts of the (t+1)th frame, the target creating block 31 in step S8 determines that the input part remaining without being integrated is the input part of a first input of a series of inputs as a target, and creates a new target.

For example, in FIG. 9, the input parts #a and #c remaining without being integrated into a target among the input parts #a to #d are each the input part of a first input of a series of inputs as a target, and new targets are created.

In step S9, the event creating block 32 creates an event "creation" indicating that the target has been created.

Incidentally, when it is determined in step S7 that there is no input part remaining without being integrated into a target of the tth frame among the input parts of the (t+1)th frame, steps S8 and S9 are skipped.

Then, the generating section 25 waits for point information of input parts of a next (t+2)th frame to be supplied from the image processing section 24, and returns to step S1 to similarly perform the process from step S1 on down.

Description will next be made of movement recognizing processing as processing for detecting an event "movement start" indicating a start of movement of a target and an event "movement end" indicating an end of movement of a target.

Figure 10:
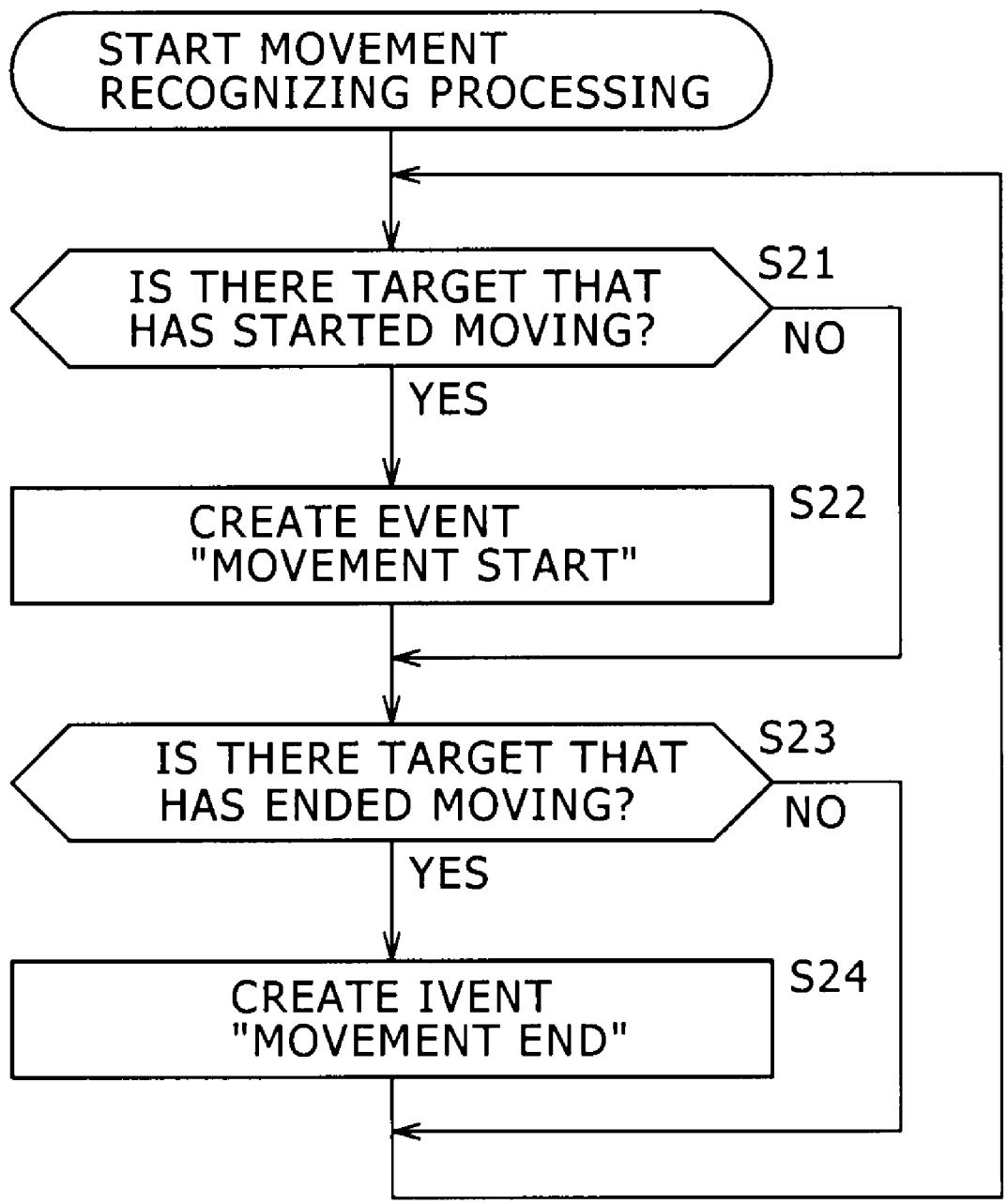
FIG. 10 is a flowchart of assistance in explaining movement recognizing processing performed by an event creating block.

The movement recognizing processing performed by the event creating block 32 in FIG. 1 will be described with reference to a flowchart of FIG. 10.

Incidentally, this movement recognizing processing and other recognizing processing to be described later are started after completion of the above-described integrating processing on the input parts of the (t+1)th frame at time t+1, for example. Incidentally, the movement recognizing processing and the other recognizing processing are performed in parallel with each other, or sequentially performed in predetermined order.

In step S21, the event creating block 32 determines whether there is a target that has started moving on the basis of a result of comparison of positional relation of the targets of the tth frame and the input parts of the (t+1)th frame which comparison is made by the target creating block 31. For example, the event creating block 32 determines whether there is a target that has started moving by determining whether among targets of the tth frame in the vicinity of which input parts of the (t+1)th frame are present, there is a target whose distance to the input part is a predetermined distance or more and for which an event "movement start" was not created at or before a (t−1)th frame. When it is determined in step S21 that there is a target that has started moving, the event creating block 32 in step S22 creates an event "movement start."

When it is determined in step S21 that there is no target that has started moving, on the other hand, step S22 is skipped.

In step S23, the event creating block 32 determines whether there is a target that has ended movement on the basis of for example the result of comparison of positional relation of the targets of the tth frame and the input parts of the (t+1)th frame which comparison is made by the target creating block 31. For example, the event creating block 32 determines whether there is a target that has ended movement by determining whether among the targets of the tth frame in the vicinity of which the input parts of the (t+1)th frame are present, there is a target whose distance to the input part is a predetermined distance or less and for which an event "movement end" was not created at or before the (t−1)th frame. When it is determined in step S23 that there is a target that has ended movement, the event creating block 32 in step S24 creates an event "movement end."

When it is determined in step S23 that there is no target that has ended movement, on the other hand, step S24 is skipped.

Then, the event creating block 32 waits for completion of integrating processing on input parts of a next (t+2)th frame, and returns to step S21 to similarly perform the process from step S21 on down.

Next, information on a target and an event which information is output from the generating section 25 to the control unit 13 after the integrating processing and the movement recognizing processing described above are performed will be described concretely with reference to FIG. 11.

Figure 11:
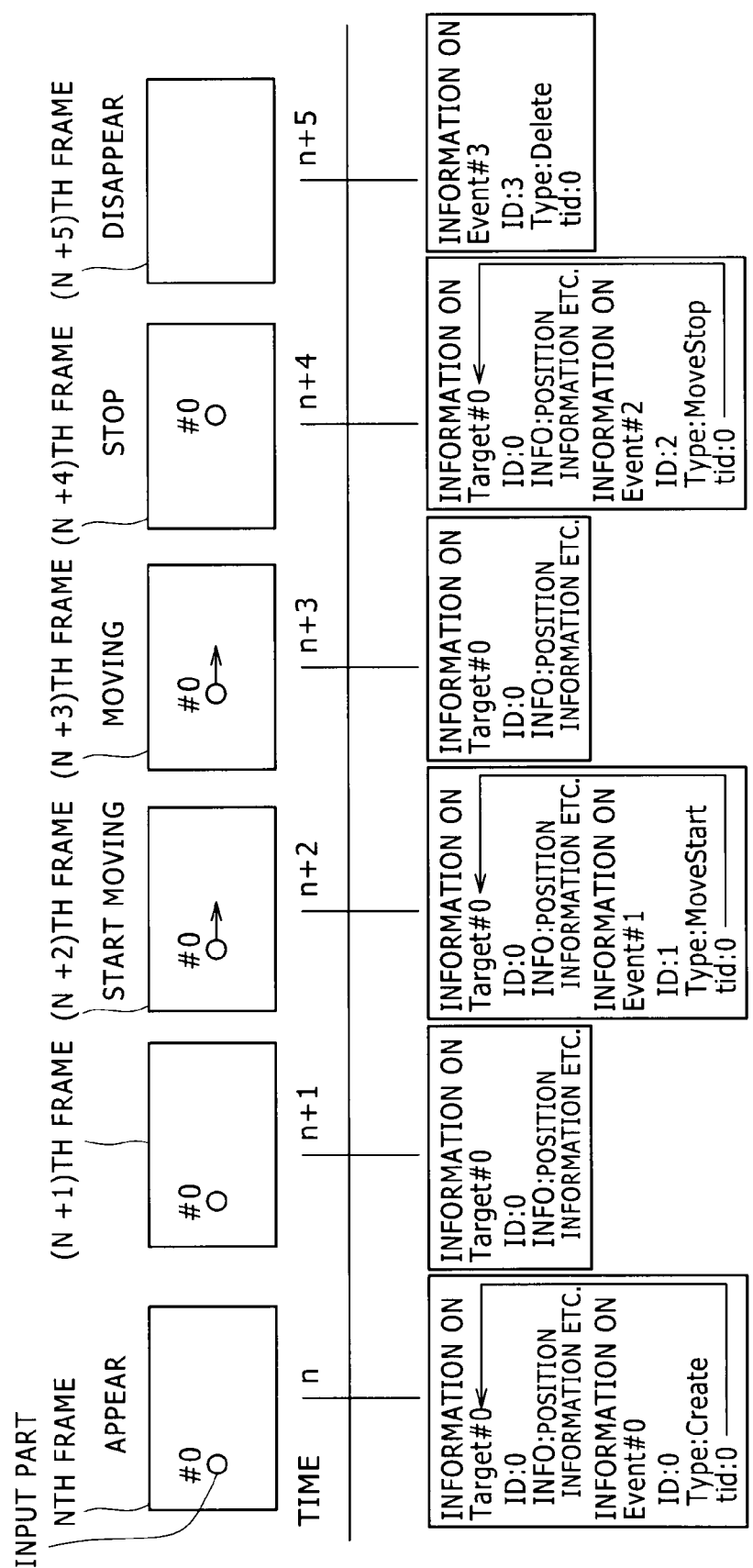
FIG. 11 is a diagram showing an example of target and event information output from the generating section to a control unit.

Suppose that in the example of FIG. 11, a user for example brings one finger into proximity to the display screen of the input-output display 22, moves the finger while keeping the finger in proximity to the display screen, and then stops keeping the finger in proximity to the display screen.

An upper diagram of FIG. 11 shows input parts (represented by white circles in the figure) of an nth frame at time n to an (n+5)th frame at time t+5. A lower diagram of FIG. 11 shows information on a target and events which information is output at the nth to the (n+5)th frames.

In this example, the user for example brings one finger into proximity to the display screen of the input-output display 22 at time n, starts moving the finger in a direction from a left to a right in FIG. 11 at time n+2 while keeping the finger in proximity to the display screen, stops the movement at time n+4, and takes the finger off the display screen at time n+5.

That is, the user brings a finger into proximity to the display screen at time n, whereby a new input part #0 appears in the nth frame, as shown in the upper diagram of FIG. 11.

In this case, a new target #0 is created in correspondence with the input part #0 of the nth frame. Specifically, as shown in the lower diagram of FIG. 11, the new target #0 whose target ID is 0 and whose position information and the like (hereinafter referred to as target-related information INFO) among target attributes is position information and the like of the input part #0 is created.

Incidentally, the entity of a target is a storage area that stores target attributes and which is secured in a memory or the like.

At the nth frame, an event "creation" is created in correspondence with the creation of the new target #0. Specifically, at the nth frame, as shown in the lower diagram of FIG. 11, a new event #0 is created which has event attributes including an event ID as identifying information of the event, an event type Type indicating the type of the event, and identifying information tid identifying the target whose state is indicated by the event, the event ID being 0, the event type Type being Create, which indicates the creation of a new event, and the identifying information tid being 0, which is the target ID of the target #0.

Because an event thus has identifying information tid identifying a target whose state is indicated by the event as one of event attributes, the target whose state is indicated by the event can be identified by the identifying information tid.

Incidentally, the entity of an event is a storage area that stores event attributes and which is secured in a memory or the like.

Next, in the (n+1)th frame, as shown in the upper diagram of FIG. 11, the input part #0 exists as it is without moving.

In this case, the input part #0 in the (n+1)th frame is present in the vicinity of the target #0 of the nth frame, and is thus integrated into the target #0. As a result, as shown in the lower diagram of FIG. 11, the target #0 at the (n+1)th frame becomes the target #0 of the nth frame whose target-related information INFO is updated by the position information and the like of the input part #0 in the (n+1)th frame, that is, a target whose target ID remains 0 and which has the position information and the like of the input part #0 in the (n+1)th frame as target-related information INFO.

In the (n+2)th frame, as shown in the upper diagram of FIG. 11, the input part #0 starts moving.

In this case, the input part #0 in the (n+2)th frame is present in the vicinity of the target #0 of the (n+1)th frame, and is thus integrated into the target #0. As a result, as shown in the lower diagram of FIG. 11, the target #0 at the (n+2)th frame becomes the target #0 of the (n+1)th frame whose target-related information INFO is updated by the position information and the like of the input part #0 in the (n+2)th frame, that is, a target whose target ID remains 0 and which has the position information and the like of the input part #0 in the (n+2)th frame as target-related information INFO.

Further, at the (n+2)th frame, an event "movement start" is created in correspondence with the start of movement of the input part #0 integrated into the target #0 and hence the start of movement of the target #0. Specifically, at the (n+2)th frame, as shown in the lower diagram of FIG. 11, a new event #1 is created which has event attributes including an event ID of for example 1, which is different from the event ID of the already created event, an event type Type of MoveStart, which indicates a start of movement of a target, and identifying information tid of 0, which is the target ID of the target #0 that has started moving.

Next, in the (n+3)th frame, as shown in the upper diagram of FIG. 11, the input part #0 is in a process of moving.

In this case, the input part #0 in the (n+3)th frame is present in the vicinity of the target #0 of the (n+2)th frame, and is thus integrated into the target #0. As a result, as shown in the lower diagram of FIG. 11, the target #0 at the (n+3)th frame becomes the target #0 of the (n+2)th frame whose target-related information INFO is updated by the position information and the like of the input part #0 in the (n+3)th frame, that is, a target whose target ID remains 0 and which has the position information and the like of the input part #0 in the (n+3)th frame as target-related information INFO.

In the (n+4)th frame, as shown in the upper diagram of FIG. 11, the input part #0 is stopped.

In this case, the input part #0 in the (n+4)th frame is present in the vicinity of the target #0 of the (n+3)th frame, and is thus integrated into the target #0. As a result, as shown in the lower diagram of FIG. 11, the target #0 at the (n+4)th frame becomes the target #0 of the (n+3)th frame whose target-related information INFO is updated by the position information and the like of the input part #0 in the (n+4)th frame, that is, a target whose target ID remains 0 and which has the position information and the like of the input part #0 in the (n+4)th frame as target-related information INFO.

Further, at the (n+4)th frame, an event "movement end" is created in correspondence with the end of movement of the input part #0 integrated into the target #0 and hence the end of movement of the target #0. Specifically, at the (n+4)th frame, as shown in the lower diagram of FIG. 11, a new event #2 is created which has event attributes including an event ID of for example 2, which is different from the event IDs of the already created events, an event type Type of MoveStop, which indicates an end of movement of a target, and identifying information tid of 0, which is the target ID of the target #0 that has ended the movement.

The user stops holding the finger in proximity to the display screen at time n+5. Thereby, at the (n+5)th frame, the input part #0 disappears, as shown in the upper diagram of FIG. 11.

In this case, at the (n+5)th frame, the target #0 is deleted in correspondence with the disappearance of the input part #0.

Further, at the (n+5)th frame, an event "deletion" is created in correspondence with the disappearance of the input part #0 and hence the deletion of the target #0. Specifically, at the (n+5)th frame, as shown in the lower diagram of FIG. 11, a new event #3 is created which has event attributes including an event ID of for example 3, which is different from the event IDs of the already created events, an event type Type of Delete, which indicates deletion of a target, and identifying information tid of 0, which is the target ID of the deleted target #0.

Figure 12:
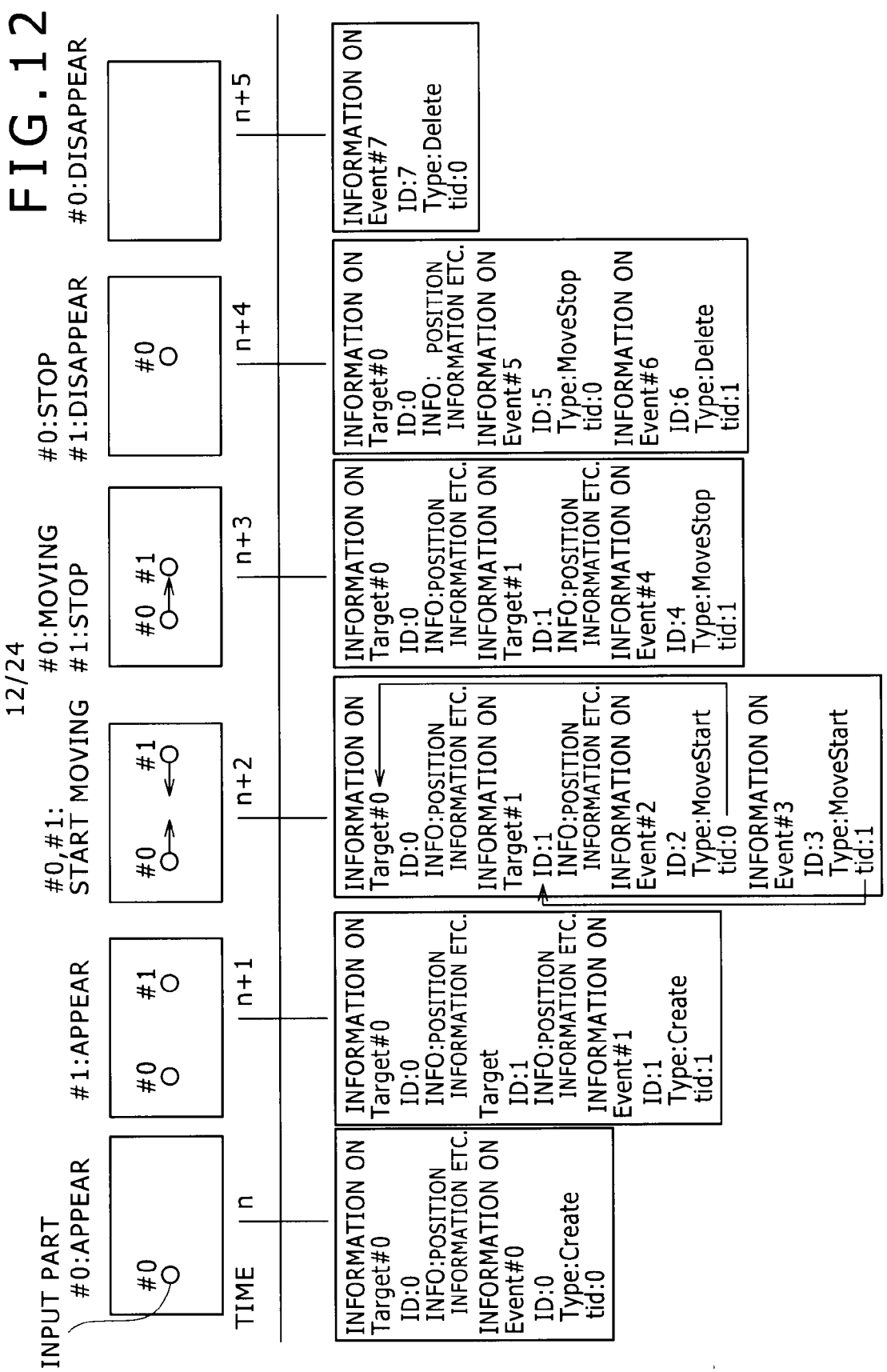
FIG. 12 is a diagram showing another example of target and event information output from the generating section to the control unit.

Information on targets and events will be further described on the basis of an example of FIG. 12.

Suppose that in the example of FIG. 12, a user brings one finger into proximity to the display screen of the input-output display 22, moves the finger while keeping the finger in proximity to the display screen, and thereafter stops keeping the finger in proximity to the display screen, and meanwhile brings another finger into proximity to the display screen of the input-output display 22, moves the finger while keeping the finger in proximity to the display screen, and thereafter stops keeping the finger in proximity to the display screen.

An upper diagram of FIG. 12 shows input parts (represented by white circles in the figure) of an nth frame to an (n+5)th frame. A lower diagram of FIG. 12 shows information on targets and events which information is output at the nth to the (n+5)th frames.

In this example, the user for example brings one finger into proximity to the display screen of the input-output display 22 at time n, starts moving the finger in a direction from a left to a right in FIG. 12 at time n+2 while keeping the finger in proximity to the display screen, stops the movement at time n+4, and stops keeping the finger in proximity to the display screen at time n+5.

In addition, the user brings another finger into proximity to the display screen at time n+1, starts moving the finger in a direction from the right to the left in FIG. 12 at time n+2 while keeping the finger in proximity to the display screen, stops the movement at time n+3, and stops keeping the finger in proximity to the display screen at time n+4.

That is, the user brings one finger into proximity to the display screen at time n, whereby a new input part #0 appears in the nth frame, as shown in the upper diagram of FIG. 12.

In this case, as in the case of FIG. 11, a new target #0 is created in correspondence with the input part #0 of the nth frame. Specifically, at the nth frame, as shown in the lower diagram of FIG. 12, the new target #0 is created which has target attributes including a target ID of 0 and position information and the like of the input part #0 of the nth frame as target-related information INFO.

Further, at the nth frame, as in the case of FIG. 12, an event "creation" is created in correspondence with the creation of the new target #0. Specifically, at the nth frame, as shown in the lower diagram of FIG. 12, a new event #0 is created which has event attributes including an event ID of 0, an event type Type of Create, and identifying information tid of 0, which is the target ID of the target #0.

Next, in the (n+1)th frame, as shown in the upper diagram of FIG. 12, the input part #0 exists as it is without moving.

In this case, the input part #0 in the (n+1)th frame is present in the vicinity of the target #0 of the nth frame, and is thus integrated into the target #0. As a result, as shown in the lower diagram of FIG. 12, the target #0 at the (n+1)th frame becomes the target #0 of the nth frame whose target-related information INFO is updated by the position information and the like of the input part #0 in the (n+1)th frame, that is, a target whose target ID remains 0 and which has the position information and the like of the input part #0 in the (n+1)th frame as target-related information INFO.

In addition, the user brings another finger into proximity to the display screen at time n+1, whereby a new input part #1 appears in the (n+1)th frame, as shown in the upper diagram of FIG. 12.

In this case, a new target #1 is created in correspondence with the input part #1 of the (n+1)th frame. Specifically, at the (n+1)th frame, as shown in the lower diagram of FIG. 12, the new target #1 is created which has target attributes including a target ID of 1, which is different from the target ID of the already created target, and position information and the like of the input part #1 of the (n+1)th frame as target-related information INFO.

Further, at the (n+1)th frame, an event "creation" is created in correspondence with the creation of the new target #1. Specifically, at the (n+1)th frame, as shown in the lower diagram of FIG. 12, a new event #1 is created which has event attributes including an event ID of 1, which is different from the event ID of the already created event, an event type Type of Create, and identifying information tid of 1, which is the target ID of the target #1.

In the (n+2)th frame, as shown in the upper diagram of FIG. 12, the input parts #0 and #1 start moving.

In this case, the input part #0 in the (n+2)th frame is present in the vicinity of the target #0 of the (n+1)th frame, and is thus integrated into the target #0. As a result, as shown in the lower diagram of FIG. 12, the target #0 at the (n+2)th frame becomes the target #0 of the (n+1)th frame whose target-related information INFO is updated by the position information and the like of the input part #0 in the (n+2)th frame, that is, a target whose target ID remains 0 and which has the position information and the like of the input part #0 in the (n+2)th frame as target-related information INFO.

Similarly, the input part #1 in the (n+2)th frame is present in the vicinity of the target #1 of the (n+1)th frame, and is thus integrated into the target #1. As a result, as shown in the lower diagram of FIG. 12, the target #1 at the (n+2)th frame becomes the target of the (n+1)th frame whose target-related information INFO is updated by the position information and the like of the input part #1 in the (n+2)th frame, that is, a target whose target ID remains 1 and which has the position information and the like of the input part #1 in the (n+2)th frame as target-related information INFO.

In addition, at the (n+2)th frame, an event "movement start" is created in correspondence with the start of movement of the input part #0 integrated into the target #0 and hence the start of movement of the target #0. Specifically, at the (n+2)th frame, as shown in the lower diagram of FIG. 12, a new event #2 is created which has event attributes including an event ID of for example 2, which is different from the event IDs of the already created events, an event type Type of MoveStart, and identifying information tid of 0, which is the target ID of the target #0 that has started moving.

Similarly, at the (n+2)th frame, an event "movement start" is created in correspondence with the start of movement of the input part #1 integrated into the target #1 and hence the start of movement of the target #1. Specifically, at the (n+2)th frame, as shown in the lower diagram of FIG. 12, a new event #3 is created which has event attributes including an event ID of for example 3, which is different from the event IDs of the already created events, an event type Type of MoveStart, and identifying information tid of 1, which is the target ID of the target #1 that has started moving.

Next, in the (n+3)th frame, as shown in the upper diagram of FIG. 12, the input part #0 is in a process of moving.

In this case, the input part #0 in the (n+3)th frame is present in the vicinity of the target #0 of the (n+2)th frame, and is thus integrated into the target #0. As a result, as shown in the lower diagram of FIG. 12, the target #0 at the (n+3)th frame becomes the target #0 of the (n+2)th frame whose target-related information INFO is updated by the position information and the like of the input part #0 in the (n+3)th frame, that is, a target whose target ID remains 0 and which has the position information and the like of the input part #0 in the (n+3)th frame as target-related information INFO.

In addition, in the (n+3)th frame, the input part #1 is stopped.

In this case, the input part #1 in the (n+3)th frame is present in the vicinity of the target #1 of the (n+2)th frame, and is thus integrated into the target #1. As a result, as shown in the lower diagram of FIG. 12, the target #1 at the (n+3)th frame becomes the target #1 of the (n+2)th frame whose target-related information INFO is updated by the position information and the like of the input part #1 in the (n+3)th frame, that is, a target whose target ID remains 1 and which has the position information and the like of the input part #1 in the (n+3)th frame as target-related information INFO.

Further, at the (n+3)th frame, an event "movement end" is created in correspondence with the end of movement of the input part #1 integrated into the target #1 and hence the end of movement of the target #1. Specifically, at the (n+3)th frame, as shown in the lower diagram of FIG. 12, a new event #4 is created which has event attributes including an event ID of for example 4, which is different from the event IDs of the already created events, an event type Type of MoveStop, and identifying information tid of 1, which is the target ID of the target #1 that has ended the movement.

Next, in the (n+4)th frame, as shown in the upper diagram of FIG. 12, the input part #0 is stopped.

In this case, the input part #0 in the (n+4)th frame is present in the vicinity of the target #0 of the (n+3)th frame, and is thus integrated into the target #0. As a result, as shown in the lower diagram of FIG. 12, the target #0 at the (n+4)th frame becomes the target #0 of the (n+3)th frame whose target-related information INFO is updated by the position information and the like of the input part #0 in the (n+4)th frame, that is, a target whose target ID remains 0 and which has the position information and the like of the input part #0 in the (n+4)th frame as target-related information INFO.

The user stops holding one finger in proximity to the display screen at time n+4, which finger was brought into proximity later. Thereby, at the (n+4)th frame, the input part #1 disappears, as shown in the upper diagram of FIG. 12.

In this case, at the (n+4)th frame, the target #1 is deleted.

In addition, at the (n+4)th frame, an event "movement end" is created in correspondence with the end of movement of the input part #0 integrated into the target #0 and hence the end of movement of the target #0. Specifically, at the (n+4)th frame, as shown in the lower diagram of FIG. 12, a new event #5 is created which has event attributes including an event ID of for example 5, which is different from the event IDs of the already created events #0 to #4, an event type Type of MoveStop, and identifying information tid of 0, which is the target ID of the target #0 that has ended the movement.

Further, at the (n+4)th frame, an event "deletion" is created in correspondence with the disappearance of the input part #1 and hence the deletion of the target #1. Specifically, at the (n+4)th frame, as shown in the lower diagram of FIG. 12, a new event #6 is created which has event attributes including an event ID of for example 6, which is different from the event IDs of the already created events, an event type Type of Delete, and identifying information tid of 1, which is the target ID of the deleted target #1.

The user stops holding the other finger in proximity to the display screen at time n+5. Thereby, at the (n+5)th frame, the input part #0 disappears, as shown in the upper diagram of FIG. 12.

In this case, at the (n+5)th frame, the target #0 is deleted.

Further, at the (n+5)th frame, an event "deletion" is created in correspondence with the disappearance of the input part #0 and hence the deletion of the target #0. Specifically, at the (n+5)th frame, as shown in the lower diagram of FIG. 12, a new event #7 is created which has event attributes including an event ID of for example 7, which is different from the event IDs of the already created events, an event type Type of Delete, and identifying information tid of 0, which is the target ID of the deleted target #0.

As described above, even when there are inputs to a plurality of points, the input-output panel 15 generates information on targets indicating a series of inputs on the basis of temporal or spatial positional relation of input parts to which the external inputs are performed, and generates and outputs information on events indicating changes in state of the targets. Therefore the information on the inputs to the plurality of points can be handled easily.

Incidentally, as the integrating processing and the recognizing processing are performed, the number of events stored in the storage block 33 continues increasing. Accordingly, the storage block 33 may perform a process of deleting information on the stored events, or so-called garbage collecting, on the basis of a predetermined condition such as when a certain time has passed or when the number of events exceeds a predetermined number, for example.

In addition, as with information on events, the storage block 33 may perform a process of deleting information on stored targets on the basis of a predetermined condition such as when a certain time has passed or when the number of targets exceeds a predetermined number, for example.

Incidentally, in the above-described integrating processing, a target not present in the vicinity of an input part of a (t+1)th frame among targets of a tth frame is deleted. In addition to this, a target not present in the vicinity of an input part of the (t+1)th frame among the targets of the tth frame may continue to be thereafter retained for a few frames and be then deleted. Then, even in a case where the user accidentally takes the finger off the display screen, for example, when the user immediately brings the finger into proximity to the display screen, an input part corresponding to the finger in proximity to the display screen at this time can be integrated into a target that is still retained. It is thus possible to prevent processing from being stopped due to such an error in operation.

In addition, all the point information of the input parts of the (t+1)th frame and all the information on the targets of the tth frame read from the storage block 33 which pieces of information are compared in event detection (recognition) are used irrespective of heights indicated by height information of these pieces of information. In addition to this, a limitation may be placed by for example using only information whose height information indicates heights within a predetermined range such as a range of a predetermined threshold value and less. By placing such a limitation, it is possible to reduce an amount of calculation for event detection.

Another example of the recognizing processing will next be described.

Suppose that, for example, the user brings two fingers into proximity to the display screen and makes a gesture such as moving the two fingers so as to draw a circle with a certain point on the display screen as the center of the circle while keeping the fingers in proximity to the display screen. As an example of recognition of such a gesture, for example, an event "rotation" can be detected (recognized) which event indicates that the absolute value of an angle formed by a line connecting points on the display screen to which points two fingers are in proximity respectively when a state of proximity of the fingers is started and a line connecting points on the display screen to which points the two fingers are in proximity respectively while moving so as to draw a circle (which angle will hereinafter be referred to as an angle of rotation) becomes a predetermined threshold value or more. This recognizing processing will be referred to as rotation recognizing processing.

Figure 13:
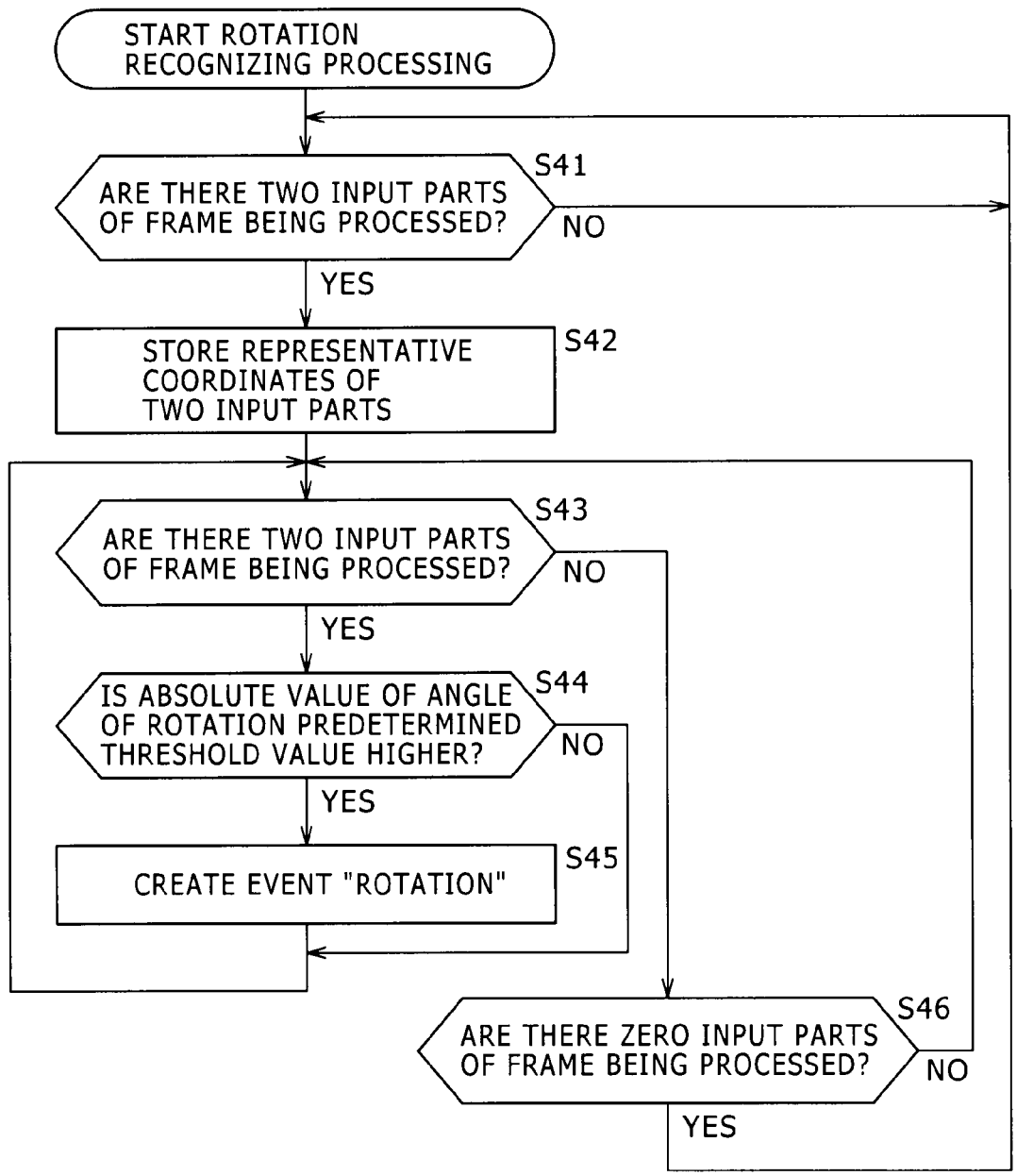
FIG. 13 is a flowchart of assistance in explaining rotation recognizing processing by the event creating block.

The rotation recognizing processing by the event creating block 32 will next be described with reference to a flowchart of FIG. 13.

In step S41, after the integrating processing by the target creating block 31 is ended, the event creating block 32 sets a frame of input parts used in the integrating processing as a frame being processed, and determines whether the frame being processed has two input parts on the basis of the point information of the input parts of the frame being processed. When it is determined in step S41 that the frame being processed has two input parts, the event creating block 32 in step S42 stores, in the storage block 33, the representative coordinates of the two input parts as representative coordinates of input parts of a start frame as a frame at the time of a start of the above-described gesture.

In step S43, after the integrating processing is ended, the event creating block 32 sets a frame of input parts used in the integrating processing as a frame being processed, and determines whether the frame being processed has two input parts on the basis of the point information of the input parts of the frame being processed. When it is determined in step S43 that the frame being processed has two input parts, the event creating block 32 in step S44 calculates the absolute value of an angle of rotation as described above from the representative coordinates of the two input parts and the representative coordinates of the input parts of the start frame, the representative coordinates of the input parts of the start frame being stored in the storage block 33, and determines whether the absolute value of the angle of rotation is the predetermined threshold value or more.

Figure 14:
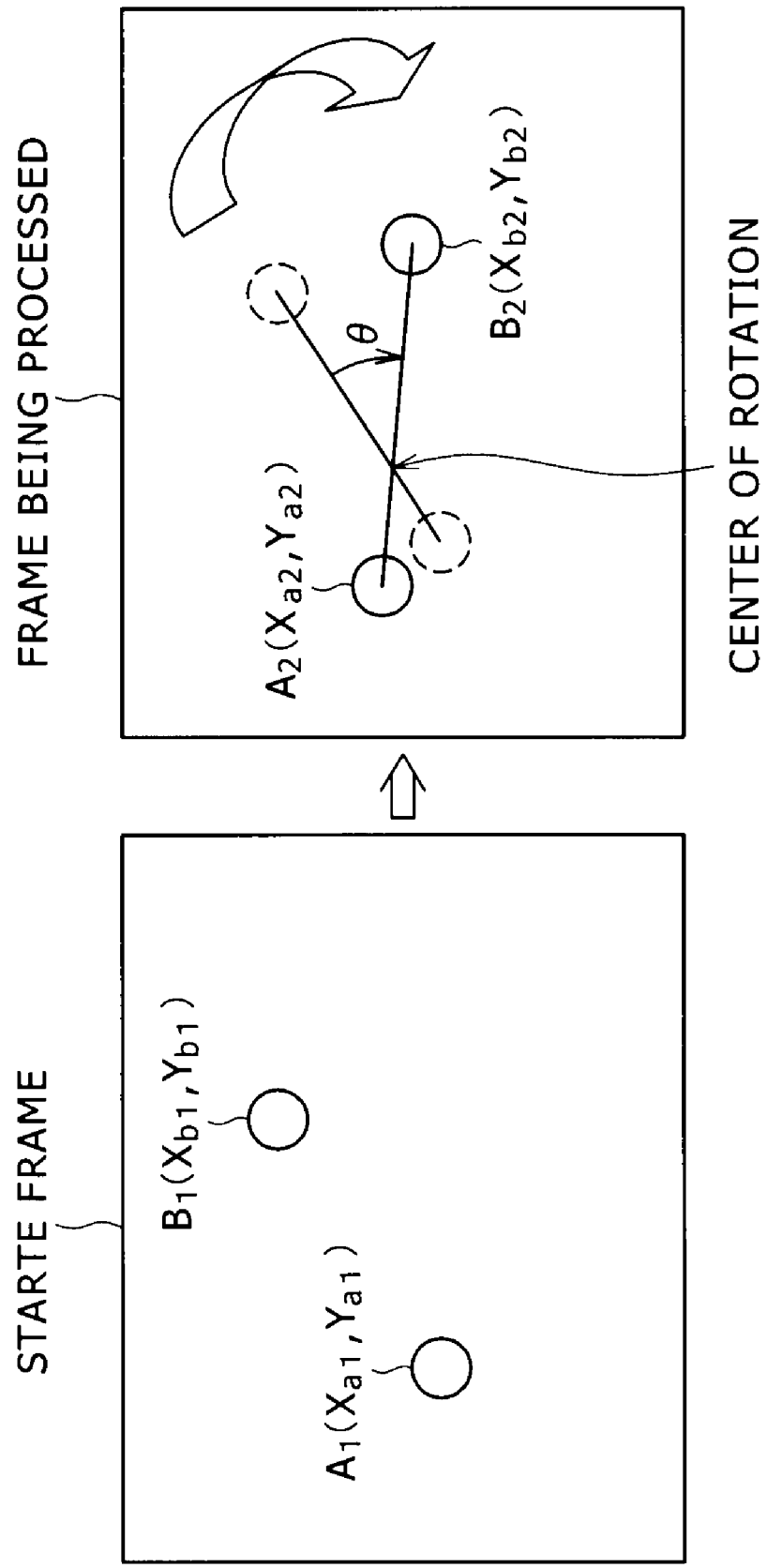
FIG. 14 is a diagram of assistance in explaining an event "rotation"

Specifically, for example, supposing that the two input parts of the start frame are input parts $A_1$ and $B_1$ as shown in a left diagram of FIG. 14, and that the two input parts of the frame being processed are input parts $A_2$ and $B_2$ as shown in a right diagram of FIG. 14, the event creating block 32 calculates an angle θ of rotation, which is an angle formed by a line connecting the two input parts $A_2$ and $B_2$ of the frame being processed with a line connecting the two input parts $A_1$ and $B_1$ of the start frame, as the above-described angle of rotation.

Incidentally, supposing that the respective representative coordinates of the input parts $A_1$ and $B_1$ of the start frame are $(X_{a1}, Y_{a1})$ and $(X_{b1}, Y_{b1})$ and that the respective representative coordinates of the input parts $A_2$ and $B_2$ of the frame being processed are $(X_{a2}, Y_{a2})$ and $(X_{b2}, Y_{b2})$, the angle θ of rotation is expressed by Equation (1) using those representative coordinates.

[Equation 1]

$$\theta = a\tan 2(y_{b1}-y_{a1}, x_{b1}-x_{a1}) - a\tan 2(y_{b2}-y_{a2}, x_{b2}-x_{a2}) \quad (1)$$

Incidentally, a function a tan 2(y, x) on the right side of Equation (1) satisfies tan(φ)=y/x for arguments x and y and returns an angle φ in units of radians in a range $-\pi \leq \phi \leq \pi$. Incidentally, when x>0 and y=0, a tan 2(y, x)=0. When x<0 and y=0, a tan 2(y, x)=π. When x=y=0, a tan 2(y, x) is undefined. When y<0, $-\pi <$ a tan 2(y, x)<0. When y>0, 0<a tan 2(y, x)<π.

When it is determined in step S44 that the angle of rotation is the predetermined threshold value or more, that is, when it is determined in step S44 that the absolute value of the angle θ of rotation is the predetermined threshold value or larger, for example, the event creating block 32 in step S45 creates an event "rotation." Then, for example, the event creating block 32 deletes the representative coordinates of the start frame from the storage block 33, and returns to step S43 to similarly perform the process from step S43 on down.

When it is determined in step S43 that the frame being processed does not have two input parts, on the other hand, the event creating block 32 in step S46 determines whether the frame being processed has zero input parts on the basis of the point information of the input parts of the frame being processed. When it is determined in step S46 that the frame being processed has zero input parts, the event creating block 32 determines that the above-described gesture is temporarily ended, and returns to step S41 to similarly perform the process from step S41 on down.

When it is determined in step S46 that the frame being processed does not have zero input parts, that is, when the frame being processed has one input part or three or more input parts, the event creating block 32 returns to step S43 to similarly perform the process from step S43 on down.

As described above, by generating an event "rotation" when the absolute value of the above-described angle θ of rotation is the predetermined threshold value or larger, it is possible to recognize a gesture such as moving two fingers so as to draw a circle with a certain point on the display screen as the center of the circle. Then, a predetermined process, for example a process of rotating an image or the like displayed on the display screen by the angle θ of rotation can be performed in response to the generation of the event "rotation."

Description has been made of a case where an event is created on the basis of representative coordinates as point information of input parts in the movement and rotation recognizing processing. In addition to this, for example, an event can be created on the basis of area information, region information or the like as point information of input parts.

For example, it is possible to recognize as an event that a finger is pressed hard against the display screen of the input-output display 22 by determining whether an area indicated by area information of an input part corresponding to the finger is a predetermined threshold value or larger, and create an event.

FIG. 15 is an example of information on targets and events output from the generating section 25 to the control unit 13 to which information height information is added.

Incidentally, the target and event information in this example is described in an XML (Extensible Markup Language) format.

In a second row from the top of the target and event information of FIG. 15, the number of a frame at a time of output of the target and event information (frameNumber) as time information on the time of the output, the number of targets of the frame at the time of the output (numOfTargets), and the number of events of the frame at the time of the output (numOfEvents) are shown to be 22, 2, and 1, respectively.

A fourth row from the top shows information on a target having a target ID of 0, of the two targets present at the frame at the time of the output (frame having the frame number of 22). Similarly, a seventh row from the top shows information on a target having a target ID of 1, of the two targets present at the frame at the time of the output.

Specifically, the fourth row or the seventh row from the top shows, in the following order from the left, the target ID (tid), the number (ft) of a frame at a time of creation of the target as time information on the time of creation of the target, the x coordinate (x) of the representative coordinates of the target and the y coordinate (y) of the representative coordinates of the target, height information (z), the area (a) of the region of the target, and the coordinate (rt) of an upper end, the coordinate (rb) of a lower end, the coordinate (rl) of a left end, and the coordinate (rr) of a right end of a minimum rectangle enclosing the target as region information. The values thereof are 0, 1, 10, 20, 10, 100, 5, 25, 5, and 15 in the fourth row from the top, and are 1, 2, 30, 40, 0, 200, 30, 50, 25, and 35 in the seventh row from the top. Incidentally, in this example, the number (ft) of the frame at the time of creation of the target, the representative coordinates (x and y) of the target, the height information (z), the area (a) of the region of the target, and the coordinates (rt, rb, rl, and rr) are target attributes.

A tenth to a fifteenth row from the top show event information on one event created at the frame at the time of the output of the target and event information (frame having the frame number of 22). Incidentally, when a plurality of events are created, rows for describing event information on each event is added, for example.

Specifically, the tenth row from the top shows, in the following order from the left, an event ID (eid), the number (fn) of a frame at a time of creation (hence a frame at a time of output) of the event as time information on the time of creation of the event, an event type (type), the number of targets whose state is indicated by the event (numOfID), and the number of pieces of added information (numOfValue) as additional information of the event. The values thereof are 1, 22, Rotate, 2, and 3 in the tenth row from the top. Incidentally, in this example, the number (fn) of the frame at the time of creation of the event, the event type (type), the number of targets (numOfID), and the number of pieces of added information (numOfValue) are event attributes.

Incidentally, thus including the number (fn) of the frame at the time of creation of the event in the event attributes makes it possible to retrieve events in order starting with a new event, for example. As a result, retrievability of events is improved.

The eleventh row and the twelfth row from the top show the target IDs of the targets whose state is indicated by the event as identifying information tid. The values thereof in this example are 0 and 1.

The thirteenth to fifteenth rows from the top show added information. The thirteenth row from the top shows the x coordinate of a rotation center of this event "rotation" as added information (extra ex). The fourteenth row from the top shows the y coordinate of the rotation center of this event "rotation" as added information (extra ex). The fifteenth row from the top shows the angle θ of rotation of this event "rotation" as added information (extra ex). The values thereof in this example are 20, 30, and 20, respectively.

Next, referring to FIGS. 16A to 21, description will be made of predetermined processing by the control unit 13 using height information on height from the display screen of a finger or the like brought into proximity to the display screen in an input performed by bringing the finger or the like into proximity to the display screen of the input-output display 22.

For example, when a user positions a finger at a height h1, which is sufficiently distant from the display screen of the input-output display 22, as shown in FIG. 16A, the portable telephone 1 displays a software keyboard on the display screen as shown in FIG. 16D. Then, when the user brings the finger into proximity to the display screen to a height h2, which is somewhat close to the display screen of the input-output display 22 and is smaller than the height h1, as shown in FIG. 16B, the portable telephone 1 displays predetermined keys to which the finger is in proximity among keys on the software keyboard in a magnified state on the display screen, as shown in FIG. 16E. Further, when the user further brings the finger into proximity to the display screen to a height h3, which is even smaller than the height h2, as shown in FIG. 16C, the portable telephone 1 displays one key to which the finger is in proximity among the keys displayed in the magnified state in a selected state (hatched part in FIG. 16F), as shown in FIG. 16F, and inputs information corresponding to the key. The processing by the control unit 13 for realizing such an operation of the portable telephone 1 will be referred to as software keyboard input processing.

Figure 17:
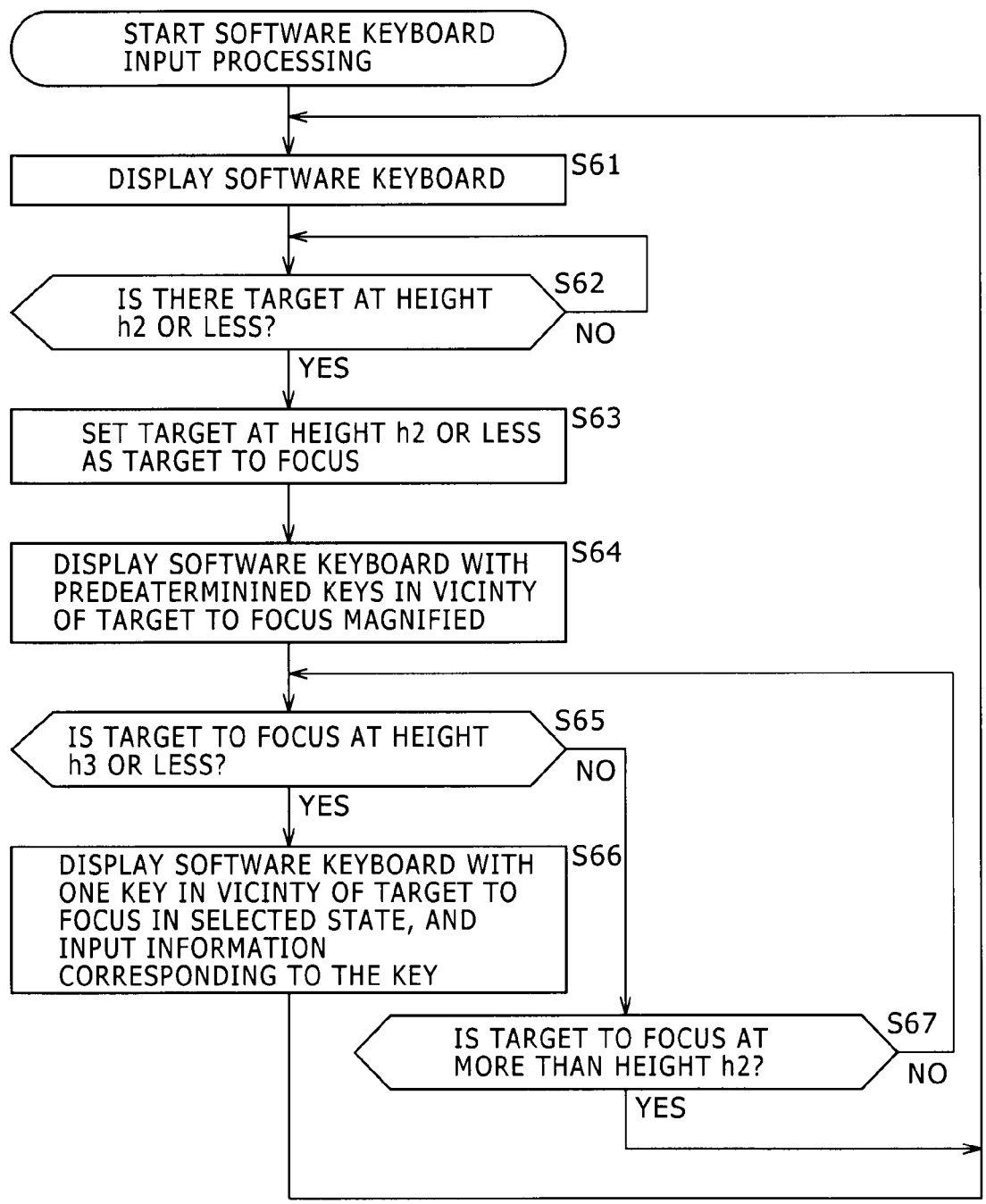
FIG. 17 is a flowchart of assistance in explaining software keyboard input processing by the control unit.

The software keyboard input processing by the control unit 13 will be described with reference to a flowchart of FIG. 17.

For example, the software keyboard input processing is started when an instruction to start input using the software keyboard is given by the user on the basis of a predetermined input to the display screen of the input-output display 22.

In step S61, the control unit 13 supplies predetermined display data to the input-output panel 15 to thereby display the software keyboard formed by a plurality of keys as shown in FIG. 16D, for example, on the display screen of the input-output display 22. Incidentally, this state of display of the software keyboard will be referred to as an initial state.

In step S62, when the target and event information of the frame is supplied from the input-output panel 15 to the control unit 13, the control unit 13 determines whether there is a target at the height h2 or less on the basis of height information of targets included in the target and event information. When it is determined in step S62 that there is a target at the height h2 or less, the control unit 13 in step S63 sets the target at the height h2 or less as a target to focus.

In step S64, the control unit 13 creates predetermined display data, and supplies the display data to the input-output panel 15 to display the software keyboard with predetermined keys in the vicinity of the target to focus in a magnified state on the input-output display 22.

Thereby, the software keyboard with a key "U," a key "I," a key "H," a key "J," a key "K," a key "N," and a key "M" as shown in FIG. 16E, for example, in a magnified state is displayed on the input-output display 22.

In step S65, when the target and event information of a next frame is supplied from the input-output panel 15 to the control unit 13, the control unit 13 determines whether the target to focus is at the height h3 or less on the basis of height information of the target to focus included in the target and event information. When it is determined in step S65 that the target to focus is at the height h3 or less, the control unit 13 in step S66 creates predetermined display data, supplies the display data to the input-output panel 15 to display the software keyboard with one key in the vicinity of the target to focus in a selected state on the input-output display 22, and inputs information corresponding to the key.

Thereby, the software keyboard as shown in FIG. 16F, for example, is displayed on the input-output display 22, and character information J corresponding to the key ("J" in the figure) is input.

The processing then returns to step S61 to similarly perform the process from step S61 on down.

When it is determined in step S65 that the target to focus is at more than the height h3, the control unit 13 in step S67 determines whether the target to focus is at more than the height h2 on the basis of the height information of the target to focus included in the target and event information supplied from the input-output panel 15. When it is determined in step S67 that the target to focus is at more than the height h2, it is assumed that the magnification of the keys is temporarily canceled. The processing then returns to step S61 to similarly perform the process from step S61 on down. Thereby the display of the software keyboard returns to the initial state.

When it is determined in step S67 that the target to focus is at the height h2 or less, on the other hand, the processing returns to step S65 to similarly perform the process from step S65 on down.

Incidentally, when it is determined in step S62 that there is no target at the height h2 or less, the processing returns to step S62 to similarly perform the process from step S62 on down.

As described above, in correspondence with the height of the finger or the like brought into proximity to the display screen, the portable telephone 1 for example displays predetermined keys in proximity to the target on the software keyboard displayed on the display screen in a magnified state, and selects one key in proximity to the target among the predetermined keys displayed in the magnified state and inputs information corresponding to the one key. Thus, for example, the user can have desired information input by a simple input operation.

Incidentally, in the present example, the portable telephone 1 makes magnified display when the target is at the height h2 or less. In addition to this, a plurality of threshold values for the height of the target may be provided, and height determination processing may be performed for each threshold value, whereby, for example, magnified display is made such that the smaller the height of the target, the larger the size of objects for magnified display. The same is true for magnified display in an example of FIGS. 20A to 20F and FIG. 21 to be described later.

Further, in the present example, the portable telephone 1 performs predetermined processing when the target reaches the height h2 or less and further the target reaches the height h3 or less. In addition to this, the portable telephone 1 may perform the predetermined processing when the target reaches the height h2 or less, further the target reaches the height h3 or less, and thereafter the height of the target becomes more than the height h3. The same is true for magnified display in an example of FIGS. 18A to 18F and FIG. 19 to be described later and an example of FIGS. 20A to 20F and FIG. 21.

Next, for example, when the user positions a finger at the height h1 sufficiently distant from the display screen of the input-output display 22, as shown in FIG. 18A, the portable telephone 1 for example displays a screen without anything on the display screen, as shown in FIG. 18D. Then, when the user brings the finger into proximity to the display screen to the height h2, which is somewhat close to the display screen, as shown in FIG. 18B, the portable telephone 1 displays a menu item in the vicinity of the finger in proximity to the display screen on the display screen, as shown in FIG. 18E. Further, when the user further brings the finger into proximity to the display screen to the height h3, as shown in FIG. 18C, the portable telephone 1 displays one item to which the finger is in proximity in the displayed menu item in a selected state (hatched part in FIG. 18F), as shown in FIG. 18F, and starts predetermined processing according to the item. The processing by the control unit 13 for realizing such an operation of the portable telephone 1 will be referred to as menu item selection processing.

Figure 19:
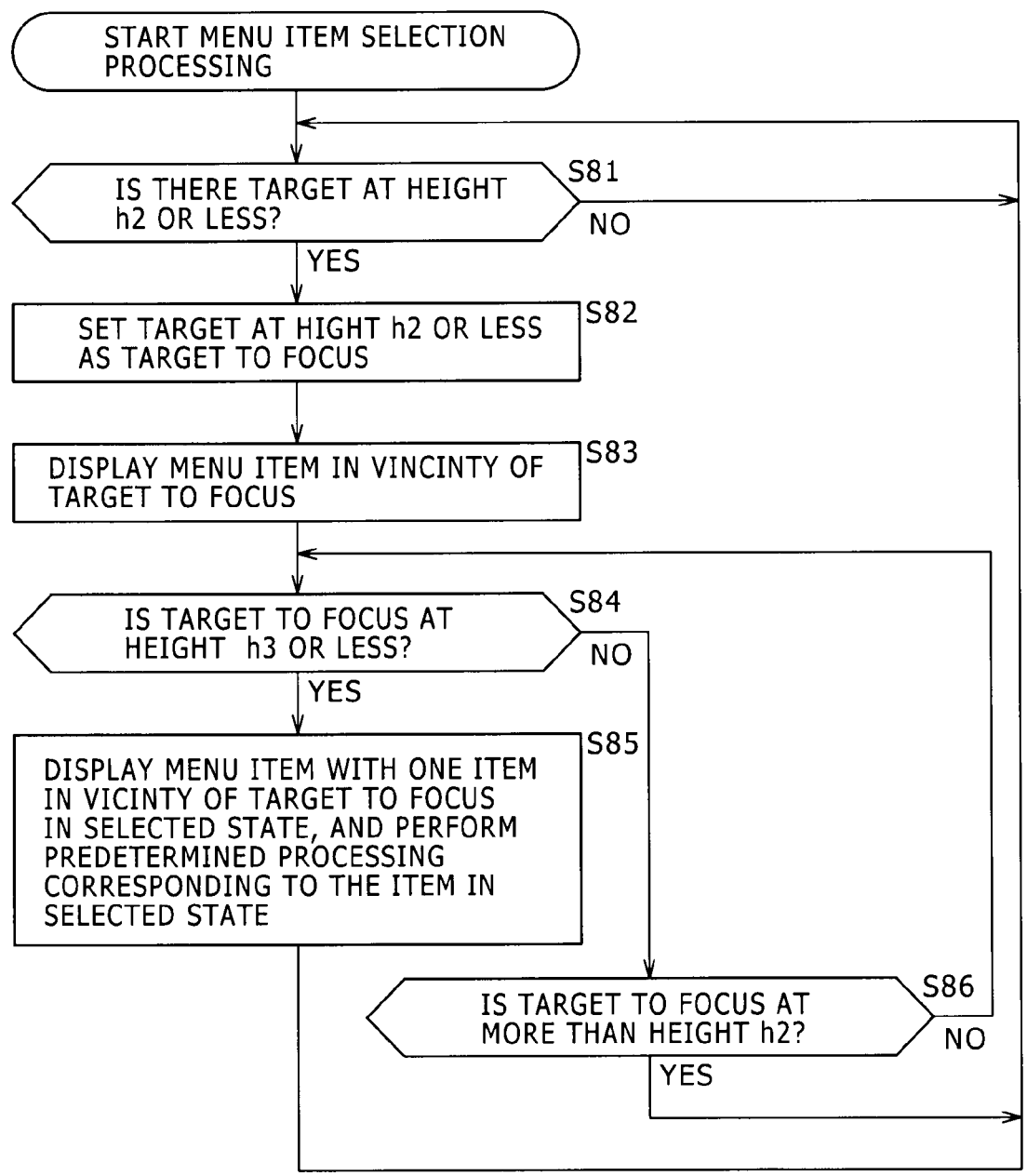
FIG. 19 is a flowchart of assistance in explaining menu item selection processing by the control unit.
Figure 20:
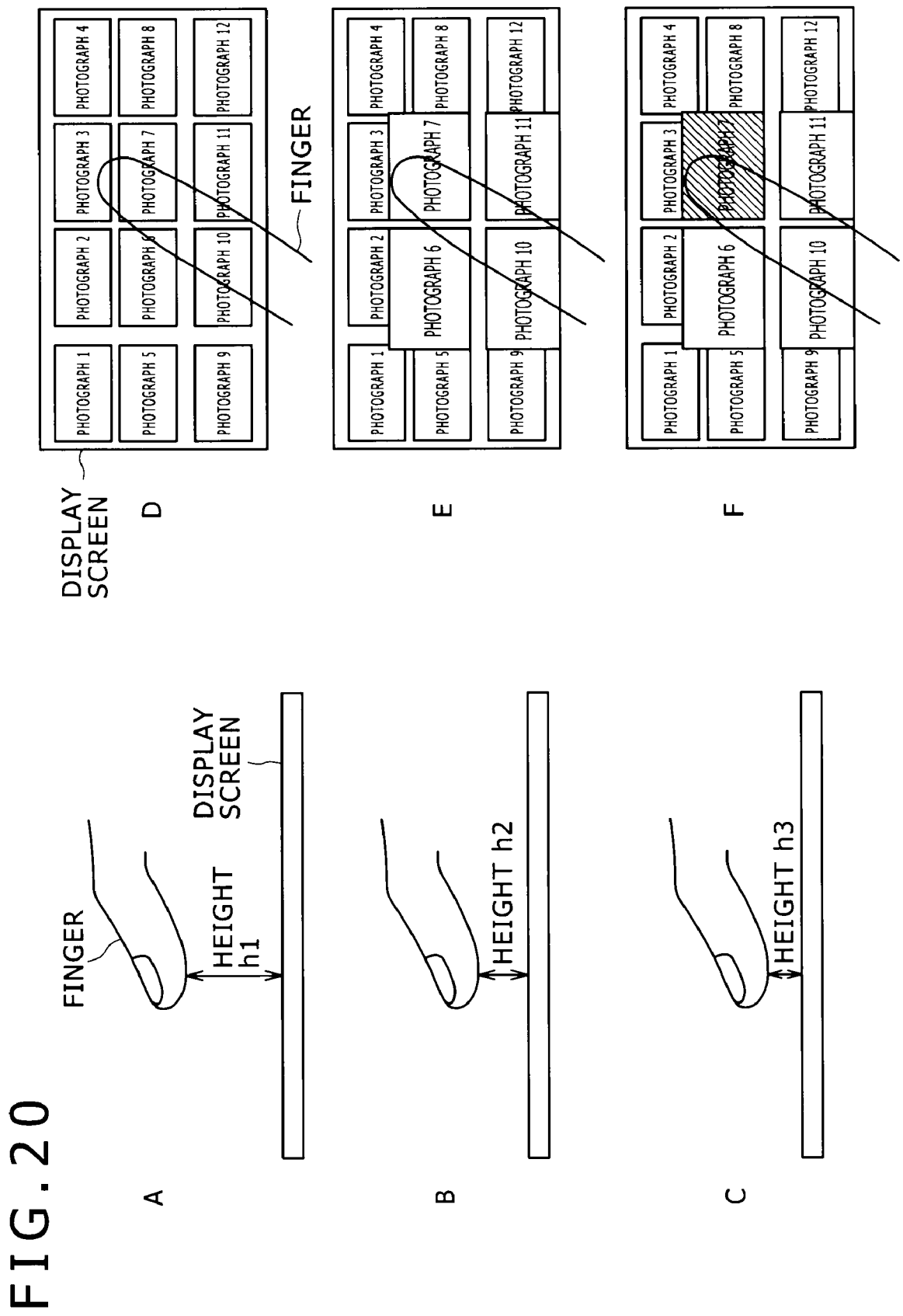
FIGS. 20A, 20B, 20C, 20D, 20E, and 20F are diagrams showing another example of processing performed by the portable telephone according to the height of a finger.

The menu item selection processing by the control unit 13 will be described with reference to a flowchart of FIG. 19.

In step S81, when the target and event information of each frame is supplied from the input-output panel 15 to the control unit 13, the control unit 13 determines whether there is a target at the height h2 or less on the basis of height information of targets included in the target and event information. When it is determined in step S81 that there is a target at the height h2 or less, the control unit 13 in step S82 sets the target at the height h2 or less as a target to focus.

In step S83, the control unit 13 creates predetermined display data, and supplies the display data to the input-output panel 15 to display the menu item in the vicinity of the target to focus on the display screen.

Thereby, the menu item as shown in FIG. 18E, for example, is displayed on the input-output display 22.

In step S84, when the target and event information of a next frame is supplied from the input-output panel 15 to the control unit 13, the control unit 13 determines whether the target to focus is at the height h3 or less on the basis of height information of the target to focus included in the target and event information. When it is determined in step S84 that the target to focus is at the height h3 or less, the control unit 13 in step S85 creates predetermined display data, supplies the display data to the input-output panel 15 to display the menu item with one item in the vicinity of the target to focus in a selected state on the input-output display 22, and performs predetermined processing corresponding to the item in the selected state.

Thereby, the menu item as shown in FIG. 18F, for example, is displayed on the input-output display 22, and an application for editing an image displayed on the display screen, for example, is started in correspondence with the item (item "EDIT" in the figure) in the selected state.

The processing then returns to step S81 to similarly perform the process from step S81 on down.

When it is determined in step S84 that the target to focus is at more than the height h3, the control unit 13 in step S86 determines whether the target to focus is at more than the height h2 on the basis of the height information of the target to focus included in the target and event information supplied from the input-output panel 15. When it is determined in step S86 that the target to focus is at more than the height h2, it is assumed that the display of the menu item is temporarily canceled. The processing then returns to step S81 to similarly perform the process from step S81 on down. Thereby the menu item ceases to be displayed.

When it is determined in step S86 that the target to focus is at the height h2 or less, on the other hand, the processing returns to step S84 to similarly perform the process from step S84 on down.

Incidentally, when it is determined in step S81 that there is no target at the height h2 or less, the processing returns to step S81 to similarly perform the process from step S81 on down.

As described above, in correspondence with the height of the finger or the like brought into proximity to the display screen, the portable telephone 1 displays the menu item in the vicinity of the target on the display screen, and selects one item in the displayed menu item and performs predetermined processing corresponding to the item. Thus, for example, the user can have the predetermined processing performed by a simple input operation.

Next, for example, when the user positions a finger at the height h1, which is sufficiently distant from the display screen of the input-output display 22, as shown in FIG. 20A, the portable telephone 1 displays a photograph list of a plurality of photographs on the display screen as shown in FIG. 20D. Then, when the user brings the finger into proximity to the display screen to the height h2, which is somewhat close to the display screen, as shown in FIG. 20B, the portable telephone 1 displays predetermined photographs to which the finger is in proximity in the photograph list in a magnified state on the display screen, as shown in FIG. 20E. Further, when the user further brings the finger into proximity to the display screen to the height h3, as shown in FIG. 20C, the portable telephone 1 displays one photograph to which the finger is in proximity among the photographs displayed in the magnified state in a selected state (hatched part in FIG. 20F), as shown in FIG. 20F, and performs predetermined processing on the photograph. The processing by the control unit 13 for realizing such an operation of the portable telephone 1 will be referred to as photograph selection processing.

Figure 21:
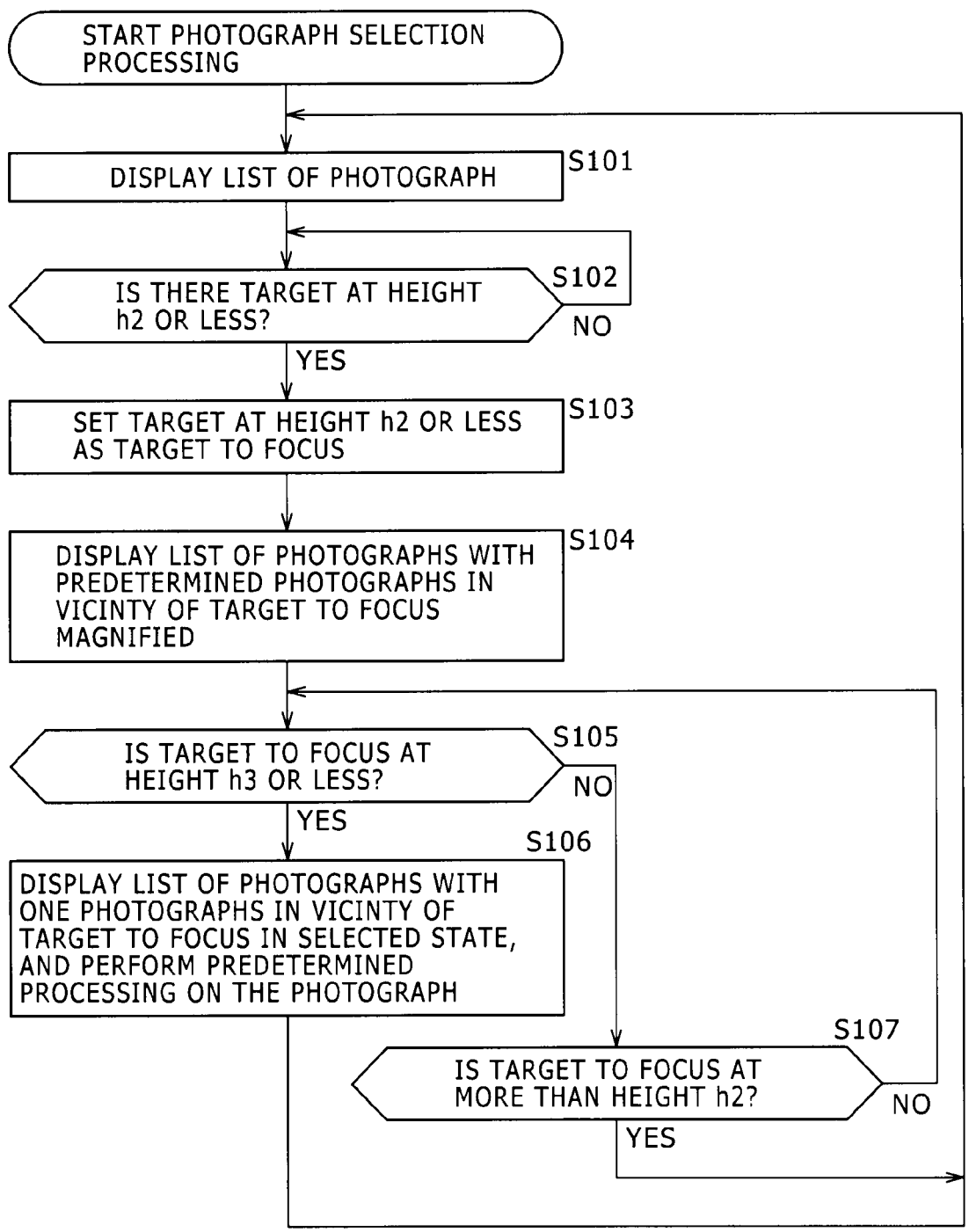
FIG. 21 is a flowchart of assistance in explaining photograph selection processing by the control unit.

The photograph selection processing by the control unit 13 will be described with reference to a flowchart of FIG. 21.

For example, the photograph selection processing is started when an instruction to display a photograph list is given by the user on the basis of a predetermined input to the display screen of the input-output display 22.

In step S101, the control unit 13 supplies predetermined display data to the input-output panel 15 to thereby display a photograph list of photographs 1 to 12 as shown in FIG. 20D, for example, on the display screen of the input-output display 22. Incidentally, this state of display of the photograph list will be referred to as an initial state.

In step S102, when the target and event information of the frame is supplied from the input-output panel 15 to the control unit 13, the control unit 13 determines whether there is a target at the height h2 or less on the basis of height information of targets included in the target and event information. When it is determined in step S102 that there is a target at the height h2 or less, the control unit 13 in step S103 sets the target at the height h2 or less as a target to focus.

In step S104, the control unit 13 creates predetermined display data, and supplies the display data to the input-output panel 15 to display the photograph list with predetermined photographs in the vicinity of the target to focus in a magnified state on the input-output display 22.

Thereby, the photograph list with a photograph 6, a photograph 7, a photograph 10, and a photograph 11 as shown in FIG. 20E, for example, in a magnified state is displayed on the input-output display 22.

In step S105, when the target and event information of a next frame is supplied from the input-output panel 15 to the control unit 13, the control unit 13 determines whether the target to focus is at the height h3 or less on the basis of height information of the target to focus included in the target and event information. When it is determined in step S105 that the target to focus is at the height h3 or less, the control unit 13 in step S106 creates predetermined display data, supplies the display data to the input-output panel 15 to display the photograph list with one photograph in the vicinity of the target to focus in a selected state on the input-output display 22, and performs predetermined processing on the photograph. For example, the control unit 13 starts processing for magnifying the photograph and displaying the magnified photograph on the entire display screen.

Thereby, the photograph list with the photograph 7 in the selected state as shown in FIG. 20F, for example, is displayed on the input-output display 22, and for example processing for magnifying the photograph 7 in the selected state and displaying the magnified photograph 7 on the entire display screen is started.

The processing then returns to step S101 to similarly perform the process from step S101 on down.

When it is determined in step S105 that the target to focus is at more than the height h3, the control unit 13 in step S107 determines whether the target to focus is at more than the height h2 on the basis of the height information of the target to focus included in the target and event information supplied from the input-output panel 15. When it is determined in step S107 that the target to focus is at more than the height h2, it is assumed that the magnification of the photographs is temporarily canceled. The processing then returns to step S101 to similarly perform the process from step S101 on down. Thereby the display of the photograph list returns to the initial state.

When it is determined in step S107 that the target to focus is at the height h2 or less, on the other hand, the processing returns to step S105 to similarly perform the process from step S105 on down.

Incidentally, when it is determined in step S102 that there is no target at the height h2 or less, the processing returns to step S102 to similarly perform the process from step S102 on down.

As described above, in correspondence with the height of the finger or the like brought into proximity to the display screen, the portable telephone 1 displays predetermined photographs in proximity to the target in the photograph list displayed on the display screen in a magnified state, and selects one photograph in proximity to the target among the predetermined photographs displayed in the magnified state and performs predetermined processing such as magnification or the like on the one photograph. Thus, for example, the user can have the predetermined processing performed on the desired photograph by a simple input operation.

Incidentally, utilizing a fact that the greater the height of the finger or the like in proximity to the display screen, the smaller the area of a light receiving part that receives light reflected from the finger or the like by optical sensors 22A and that an area indicated by area information of target information supplied (output) from the generating section 25 to the control unit 13 is correspondingly decreased, the portable telephone 1 can make threshold value determination of the area indicated by the area information in addition to the threshold value determination of the height indicated by height information added to the target information. Thus, for example, processing according to the height of the finger or the like can be performed more reliably.

Figure 22:
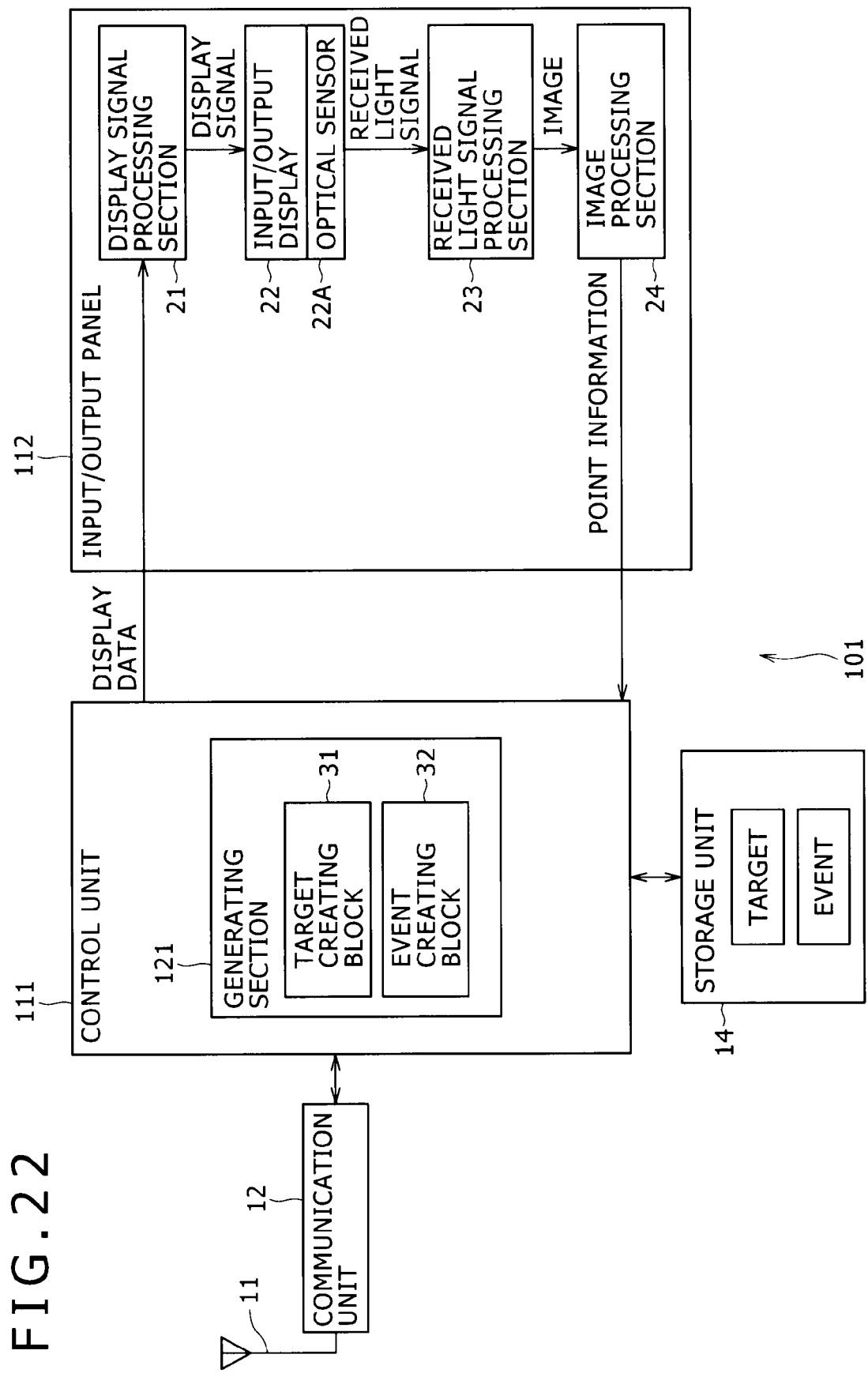
FIG. 22 is a diagram showing another example of configuration of the portable telephone.

FIG. 22 is a block diagram showing an example of configuration of another embodiment of a portable telephone to which the present invention is applied.

In the portable telephone 101 of FIG. 22, a control unit 111 is formed by moving the generating section 25 in the input-output panel 15 in FIG. 1 to the control unit 13. However, in FIG. 22, a storage unit 14 is used as the storage block 33 in FIG. 1.

Hence, the portable telephone 101 of FIG. 22 can perform similar processing to that of the portable telephone 1 in FIG. 1.

Figure 23:
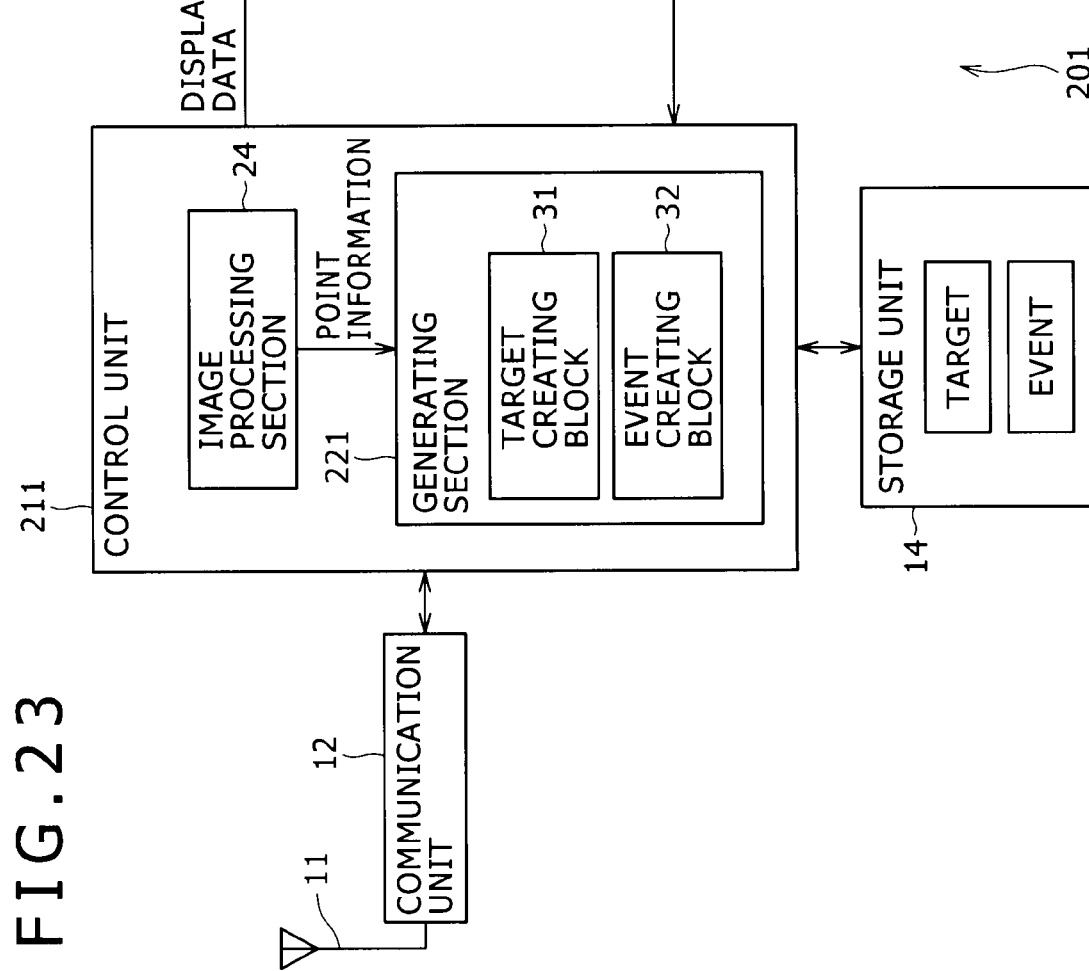
FIG. 23 is a diagram showing another example of configuration of the portable telephone.

FIG. 23 is a block diagram showing an example of configuration of another embodiment of a portable telephone to which the present invention is applied.

In the portable telephone 201 of FIG. 23, a control unit 211 is formed by moving the image processing unit 24 and the generating section 25 in the input-output panel 15 in FIG. 1 to the control unit 13. However, in FIG. 23, a storage unit 14 is used as the storage block 33 in FIG. 1.

The series of pieces of processing described above can be carried out not only by hardware but also by software. When the series of pieces of processing is to be carried out by software, a program constituting the software is installed from a program recording medium onto a computer incorporated in dedicated hardware, or a general-purpose personal computer, for example, that can perform various functions by installing various programs thereon.

FIG. 24 is a block diagram showing an example of configuration of hardware of a computer that performs the series of pieces of processing described above by program.

In the computer, a CPU 241, a ROM 242, and a RAM 243 are interconnected by a bus 244.

The bus 244 is also connected with an input-output interface 245. The input-output interface 245 is connected with an input unit 246 formed by a keyboard, a mouse, a microphone and the like, an output unit 247 formed by a display, a speaker and the like, a storage unit 248 formed by a hard disk, a nonvolatile memory and the like, a communication unit 249 formed by a network interface and the like, and a drive 250 for driving removable media 251 such as a magnetic disk, an optical disk, a magneto-optical disk, a semiconductor memory or the like.

In the computer configured as described above, the CPU 241 for example loads a program stored in the storage unit 248 into the RAM 243 via the input-output interface 245 and the bus 244, and then executes the program, whereby the series of pieces of processing described above is performed.

The program executed by the computer (CPU 241) is for example provided in a state of being recorded on the removable media 251, which are packaged media formed by a magnetic disk (including flexible disks), an optical disk (including CD-ROM (Compact Disk-Read Only Memory), DVD (Digital Versatile Disk) and the like), a magneto-optical disk, a semiconductor memory or the like, or via a wire or wireless transmission medium such as a local area network, the Internet, digital satellite broadcasting or the like.

Then, by mounting the removable media 251 in the drive 250, the program can be installed into the storage unit 248 via the input-output interface 245. The program can also be received by the communication unit 249 via the wire or wireless transmission medium and then installed into the storage unit 248. In addition, the program can be installed into the ROM 242 or the storage unit 248 in advance.

Incidentally, the program executed by the computer may perform processing in time series in the order described in the present specification, or may perform processing in parallel or in necessary timing such as when a call is made.

It is to be noted that an embodiment of the present invention may be not only the portable telephone 1 described above but also a TV (Television) receiver, for example, and that various changes can be made without departing from the spirit of the present invention.

It should be understood by those skilled in the art that various modifications, combinations, sub-combinations and alterations may occur depending on design requirements and other factors insofar as they are within the scope of the appended claims or the equivalents thereof.

In the drawings
FIG. 1
1-1: DISPLAY DATA
1-2: INFORMATION ON TARGET AND EVENT
1-3: DISPLAY SIGNAL
1-4: RECEIVED LIGHT SIGNAL
1-5: IMAGE
1-6: POINT INFORMATION
1-7: TARGET
1-8: EVENT
12: COMMUNICATION UNIT
13: CONTROL UNIT
14: STORAGE UNIT
15: INPUT-OUTPUT PANEL
21: DISPLAY SIGNAL PROCESSING SECTION 22: INPUT-OUTPUT DISPLAY
22A: OPTICAL SENSOR
23: RECEIVED LIGHT SIGNAL PROCESSING SECTION
24: IMAGE PROCESSING SECTION
25: GENERATING SECTION
31: TARGET CREATING BLOCK
32: EVENT CREATING BLOCK
33: STORAGE BLOCK
FIG. 2
2-1: REGION INFORMATION
2-2: REPRESENTATIVE COORDINATES
2-3: AREA INFORMATION
2-4: IMAGE AFTER IMAGE PROCESSING
2-5: INPUT PART
2-6: INPUT PART
2-7: INPUT PART
FIG. 3
3-1: CONTROL SOFTWARE
3-2: OUTPUT PROCESSING
3-3: EVENT
3-4: TARGET
3-5: CREATION OF TARGET AND EVENT
3-6: PROCESSING FOR RECOGNIZING MOVEMENT, GESTURE, ETC.
3-7: INTEGRATING PROCESSING
3-8: POINT INFORMATION GENERATING PROCESSING
3-9: RECEIVED LIGHT SIGNAL PROCESSING
3-10: RECEIVED LIGHT SIGNAL
22: INPUT-OUTPUT DISPLAY
22A: OPTICAL SENSOR
FIG. 4
4-1: LUMINANCE VALUE
4-2: DISPLAY SCREEN
4-3: CONTACT THRESHOLD VALUE
4-4: NON-CONTACT THRESHOLD VALUE
FIG. 5
5-1: LUMINANCE VALUE
5-2: DISPLAY SCREEN
5-3: CONTACT THRESHOLD VALUE
5-4: NON-CONTACT THRESHOLD VALUE #1
5-5: NON-CONTACT THRESHOLD VALUE #2
5-6: NON-CONTACT THRESHOLD VALUE #3
FIG. 6
6-1: START INTEGRATING PROCESSING
S1: COMPARE POSITIONAL RELATION OF TARGETS OF TTH FRAME AND INPUT PARTS OF (T+1)TH FRAME
S2: IS THERE TARGET IN VICINITY OF WHICH INPUT PART OF (T+1) TH FRAME IS PRESENT AMONG TARGETS OF TTH FRAME?
S3: INTEGRATE INPUT PART INTO TARGET
S4: IS THERE TARGET IN VICINITY OF WHICH NO INPUT PART OF (T+1)TH FRAME IS PRESENT AMONG TARGETS OF TTH FRAME?
S5: DELETE TARGET
S6: CREATE EVENT "DELETION"
S7: IS THERE INPUT PART REMAINING WITHOUT BEING INTEGRATED INTO TARGET AMONG INPUT PARTS OF (T+1)TH FRAME?
S8: CREATE NEW TARGET
S9: CREATE EVENT "CREATION"
FIG. 7
7-1: TTH FRAME
7-2: TIME: t
FIG. 8
8-1: (T+1)TH FRAME
8-2: TIME: t+1
FIG. 9
9-1: TTH FRAME AND (T+1)TH FRAME
9-2: DELETE
9-3: CREATE
9-4: INTEGRATE (MERGE)
FIG. 10
10-1: START MOVEMENT RECOGNIZING PROCESSING
S21: IS THERE TARGET THAT HAS STARTED MOVING?
S22: CREATE EVENT "MOVEMENT START"
S23: IS THERE TARGET THAT HAS ENDED MOVEMENT?
S24: CREATE EVENT "MOVEMENT END"
FIG. 11
11-1: INPUT PART
11-2: NTH FRAME
11-3: APPEAR
11-4: TIME
11-5: (N+1)TH FRAME
11-6: (N+2)TH FRAME
11-7: START MOVING
11-8: (N+3)TH FRAME
11-9: MOVING
11-10: (N+4)TH FRAME
11-11: STOP
11-12: (N+5)TH FRAME
11-13: DISAPPEAR
11-14: INFORMATION ON TARGET #0
11-15: POSITION INFORMATION ETC.
11-16: INFORMATION ON EVENT #0
11-17: INFORMATION ON TARGET #0
11-18: POSITION INFORMATION ETC.
11-19: INFORMATION ON TARGET #0
11-20: POSITION INFORMATION ETC.
11-21: INFORMATION ON EVENT #1
11-22: INFORMATION ON TARGET #0
11-23: POSITION INFORMATION ETC.
11-24: INFORMATION ON TARGET #0
11-25: POSITION INFORMATION ETC.
11-26: INFORMATION ON EVENT #2
11-27: INFORMATION ON EVENT #3
FIG. 12
12-1: INPUT PART
12-2: #0: APPEAR
12-3: TIME
12-4: #1: APPEAR
12-5: #0, #1: START MOVING
12-6: #0: MOVING
12-7: #1: STOP
12-8: #0: STOP
12-9: #1: DISAPPEAR
12-10: #0: DISAPPEAR
12-11: INFORMATION ON TARGET #0
12-12: POSITION INFORMATION ETC.
12-13: INFORMATION ON EVENT #0
12-14: INFORMATION ON TARGET #0
12-15: POSITION INFORMATION ETC.
12-16: POSITION INFORMATION ETC.
12-17: INFORMATION ON EVENT #1
12-18: INFORMATION ON TARGET #0
12-19: POSITION INFORMATION ETC.
12-20: INFORMATION ON TARGET #1
12-21: POSITION INFORMATION ETC.
12-22: INFORMATION ON EVENT #2
12-23: INFORMATION ON EVENT #3

12-24: INFORMATION ON TARGET #0
12-25: POSITION INFORMATION ETC.
12-26: INFORMATION ON TARGET #1
12-27: POSITION INFORMATION ETC.
12-28: INFORMATION ON EVENT #4
12-29: INFORMATION ON TARGET #0
12-30: POSITION INFORMATION ETC.
12-31: INFORMATION ON EVENT #5
12-32: INFORMATION ON EVENT #6
12-33: INFORMATION ON EVENT #7
FIG. 13
13-1: START ROTATION RECOGNIZING PROCESSING
S41: ARE THERE TWO INPUT PARTS OF FRAME BEING PROCESSED?
S42: STORE REPRESENTATIVE COORDINATES OF TWO INPUT PARTS
S43: ARE THERE TWO INPUT PARTS OF FRAME BEING PROCESSED?
S44: IS ABSOLUTE VALUE OF ANGLE OF ROTATION PREDETERMINED THRESHOLD VALUE OR HIGHER?
S45: CREATE EVENT "ROTATION"
S46: ARE THERE ZERO INPUT PARTS OF FRAME BEING PROCESSED?
FIG. 14
14-1: START FRAME
14-2: FRAME BEING PROCESSED
14-3: CENTER OF ROTATION
FIG. 15
15-1: FRAME NUMBER
15-2: NUMBER OF TARGETS
15-3: NUMBER OF EVENTS
15-4: NUMBER OF FRAME OF FIRST INPUT
15-5: TARGET ID
15-6: REPRESENTATIVE COORDINATES
15-7: HEIGHT INFORMATION
15-8: AREA INFORMATION
15-9: REGION INFORMATION
15-10: TARGET ID OF TARGET WHOSE STATE IS INDICATED BY EVENT
15-11: NUMBER OF PIECES OF ADDITIONAL INFORMATION
15-12: ADDITIONAL INFORMATION
15-13: NUMBER OF TARGETS WHOSE STATES ARE INDICATED BY EVENTS
FIG. 16
16-1: FINGER
16-2: HEIGHT h1
16-3: DISPLAY SCREEN
16-4: HEIGHT h2
16-5: HEIGHT h3
16-6: DISPLAY SCREEN
16-7: SOFTWARE KEYBOARD
16-8: FINGER
FIG. 17
17-1: START SOFTWARE KEYBOARD INPUT PROCESSING
S61: DISPLAY SOFTWARE KEYBOARD
S62: IS THERE TARGET AT HEIGHT h2 OR LESS?
S63: SET TARGET AT HEIGHT h2 OR LESS AS TARGET TO FOCUS
S64: DISPLAY SOFTWARE KEYBOARD WITH PREDETERMINED KEYS IN VICINITY OF TARGET TO FOCUS MAGNIFIED
S65: IS TARGET TO FOCUS AT HEIGHT h3 OR LESS?
S66: DISPLAY SOFTWARE KEYBOARD WITH ONE KEY IN VICINITY OF TARGET TO FOCUS IN SELECTED STATE, AND INPUT INFORMATION CORRESPONDING TO THE KEY
S67: IS TARGET TO FOCUS AT MORE THAN HEIGHT h2?
FIG. 18
18-1: FINGER
18-2: HEIGHT h1
18-3: DISPLAY SCREEN
18-4: HEIGHT h2
18-5: HEIGHT h3
18-6: DISPLAY SCREEN
18-7: FINGER
18-8: FILE
18-9: EDIT
18-10: DISPLAY
18-11: ITEM
18-12: MENU ITEM
18-13: FILE
18-14: EDIT
18-15: DISPLAY
FIG. 19
19-1: START MENU ITEM SELECTION PROCESSING
S81: IS THERE TARGET AT HEIGHT h2 OR LESS?
S82: SET TARGET AT HEIGHT h2 OR LESS AS TARGET TO FOCUS
S83: DISPLAY MENU ITEM IN VICINITY OF TARGET TO FOCUS
S84: IS TARGET TO FOCUS AT HEIGHT h3 OR LESS?
S85: DISPLAY MENU ITEM WITH ONE ITEM IN VICINITY OF TARGET TO FOCUS IN SELECTED STATE, AND PERFORM PREDETERMINED PROCESSING CORRESPONDING TO THE ITEM IN SELECTED STATE
S86: IS TARGET TO FOCUS AT MORE THAN HEIGHT h2?
FIG. 20
20-1: FINGER
20-2: HEIGHT h1
20-3: DISPLAY SCREEN
20-4: HEIGHT h2
20-5: HEIGHT h3
20-6: DISPLAY SCREEN
20-7: PHOTOGRAPH 1
20-8: PHOTOGRAPH 2
20-9: PHOTOGRAPH 3
20-10: PHOTOGRAPH 4
20-11: PHOTOGRAPH 5
20-12: PHOTOGRAPH 6
20-13: PHOTOGRAPH 7
20-14: PHOTOGRAPH 8
20-15: PHOTOGRAPH 9
20-16: PHOTOGRAPH 10
20-17: PHOTOGRAPH 11
20-18: PHOTOGRAPH 12
20-19: FINGER
20-20: PHOTOGRAPH 1
20-21: PHOTOGRAPH 2
20-22: PHOTOGRAPH 3
20-23: PHOTOGRAPH 4
20-24: PHOTOGRAPH 5
20-25: PHOTOGRAPH 6
20-26: PHOTOGRAPH 7
20-27: PHOTOGRAPH 8
20-28: PHOTOGRAPH 9
20-29: PHOTOGRAPH 10
20-30: PHOTOGRAPH 11
20-31: PHOTOGRAPH 12

20-32: PHOTOGRAPH 1
20-33: PHOTOGRAPH 2
20-34: PHOTOGRAPH 3
20-35: PHOTOGRAPH 4
20-36: PHOTOGRAPH 5
20-37: PHOTOGRAPH 6
20-38: PHOTOGRAPH 7
20-39: PHOTOGRAPH 8
20-40: PHOTOGRAPH 9
20-41: PHOTOGRAPH 10
20-42: PHOTOGRAPH 11
20-43: PHOTOGRAPH 12
FIG. 21
21-1: START PHOTOGRAPH SELECTION PROCESSING
S101: DISPLAY LIST OF PHOTOGRAPHS
S102: IS THERE TARGET AT HEIGHT h2 OR LESS?
S103: SET TARGET AT HEIGHT h2 OR LESS AS TARGET TO FOCUS
S104: DISPLAY LIST OF PHOTOGRAPHS WITH PREDETERMINED PHOTOGRAPHS IN VICINITY OF TARGET TO FOCUS MAGNIFIED
S105: IS TARGET TO FOCUS AT HEIGHT h3 OR LESS?
S106: DISPLAY LIST OF PHOTOGRAPHS WITH ONE PHOTOGRAPH IN VICINITY OF TARGET TO FOCUS IN SELECTED STATE, AND PERFORM PREDETERMINED PROCESSING ON THE PHOTOGRAPH
S107: IS TARGET TO FOCUS AT MORE THAN HEIGHT h2?
FIG. 22
22-1: DISPLAY DATA
22-2: DISPLAY SIGNAL
22-3: RECEIVED LIGHT SIGNAL
22-4: IMAGE
22-5: POINT INFORMATION
22-6: TARGET
22-7: EVENT
12: COMMUNICATION UNIT
14: STORAGE UNIT
21: DISPLAY SIGNAL PROCESSING SECTION
22: INPUT-OUTPUT DISPLAY
22A: OPTICAL SENSOR
23: RECEIVED LIGHT SIGNAL PROCESSING SECTION
24: IMAGE PROCESSING SECTION
31: TARGET CREATING BLOCK
32: EVENT CREATING BLOCK
111: CONTROL UNIT
112: INPUT-OUTPUT PANEL
121: GENERATING UNIT
FIG. 23
23-1: DISPLAY DATA
23-2: DISPLAY SIGNAL
23-3: RECEIVED LIGHT SIGNAL
23-4: IMAGE
23-5: POINT INFORMATION
23-6: TARGET
23-7: EVENT
12: COMMUNICATION UNIT
14: STORAGE UNIT
21: DISPLAY SIGNAL PROCESSING SECTION
22: INPUT-OUTPUT DISPLAY
22A: OPTICAL SENSOR
23: RECEIVED LIGHT SIGNAL PROCESSING SECTION
24: IMAGE PROCESSING SECTION
31: TARGET CREATING BLOCK
32: EVENT CREATING BLOCK
211: CONTROL UNIT
212: INPUT-OUTPUT PANEL
221: GENERATING UNIT
FIG. 24
245: INPUT-OUTPUT INTERFACE
246: INPUT UNIT
247: OUTPUT UNIT
248: STORAGE UNIT
249: COMMUNICATION UNIT
250: DRIVE
251: REMOVABLE MEDIA

What is claimed is:

1. An input device having an input unit for receiving light corresponding to an external input, and allowing input to a plurality of points on an input surface of said input unit, said input device comprising:
target creating means for generating information on a target indicating a series of external inputs on a basis of temporal or spatial positional relation of input parts to which the inputs have been performed;
display means for displaying an image, the display means corresponding to said input surface of said input unit;
performing means for performing predetermined processing on a basis of the information on said target; and
height information generating means for generating height information indicating height of said target from said input surface on a basis of an amount of light received in said input unit;
wherein said target creating means generates the information on said target to which information said height information is added, and said performing means performs predetermined processing on a basis of said height information added to the information on said target, and the display means does not display any image when the height of the target is greater than a first height, displays a first image when the height of the target is less than the first height but not touching the display means, and displays a second image when the target touches the display means.

2. The input device according to claim 1, wherein when there is a target whose height indicated by said height information added to information on said target is a first threshold value or less, said performing means sets said target as a target to focus, and displays predetermined keys in proximity to the target to focus, said predetermined keys being included in a software keyboard formed by a plurality of keys displayed on said display screen, in a magnified state on said display screen, and when the height indicated by said height information added to the information on the target to focus becomes a second threshold value or less, said second threshold value being smaller than said first threshold value, or when the height indicated by said height information added to the information on the target to focus becomes more than said second threshold value after becoming said second threshold value or less, said performing means selects one key in proximity to the target to focus among said predetermined keys, and inputs information corresponding to said one key.

3. The input device according to claim 1, wherein when there is a target whose height indicated by said height information added to information on said target is a first threshold value or less, said performing means sets said target as a target to focus, and displays a menu item including a plurality of items on said display screen, and when the height indicated by said height information added to the information on the target to focus becomes a second threshold value or less, said second threshold value being smaller than said first threshold value, or when the height indicated by said height information added to the information on the target to focus becomes more than said second threshold value after becoming said second threshold value or less, said performing means selects one item in proximity to the target to focus among said plurality of items, and performs predetermined processing corresponding to said one item.

4. An input device according to claim 1, wherein when there is a target whose height indicated by said height information added to information on said target is a first threshold value or less, said performing means sets said target as a target to focus, and displays predetermined photographs in proximity to the target to focus, said predetermined photographs being included in a photograph list of a plurality of photographs displayed on said display screen, in a magnified state on said display screen, and when the height indicated by said height information added to the information on the target to focus becomes a second threshold value or less, said second threshold value being smaller than said first threshold value, or when the height indicated by said height information added to the information on the target to focus becomes more than said second threshold value after becoming said second threshold value or less, said performing means selects one key in proximity to the target to focus among said predetermined photographs, and performs predetermined processing on said one photograph.

5. The input device according to claim 1, further comprising:
event creating means for recognizing an event indicating a change in state of said target on a basis of the information on said target, and generating information on said event, wherein said performing means performs predetermined processing on a basis of the information on said event.

6. The input device according to claim 5, wherein said event creating means recognizes said event when the height indicated by said height information added to the information on said target is in a predetermined range.

7. A control method of an input device, said input device having an input unit for receiving light corresponding to an external input, and allowing input to a plurality of points on an input surface of said input unit, said control method comprising:
generating information on a target indicating a series of external inputs on a basis of temporal or spatial positional relation of input parts to which the inputs have been performed;
performing predetermined processing on a basis of the information on said target;
generating height information indicating height of said target from said input surface on a basis of an amount of light received in said input unit; and
displaying no image on the input surface when the height of the target is greater than a first height, displaying a first image on the input surface when the height of the target is less than the first height but not touching the input surface, and displaying a second image on the input surface when the target touches the input surface,
wherein in a process of said generating, the information on said target to which information said height information is added is generated, and in a process of said performing, predetermined processing is performed on a basis of said height information added to the information on said target.

8. A non-transitory computer readable medium encoded with a program for making a computer perform a control processing method for an input device, said input device having an input unit for receiving light corresponding to an external input, and allowing input to a plurality of points on an input surface of said input unit, said method comprising:
generating information on a target indicating a series of external inputs on a basis of temporal or spatial positional relation of input parts to which the inputs have been performed;
performing predetermined processing on a basis of the information on said target;
generating height information indicating height of said target from said input surface on a basis of an amount of light received in said input unit; and
displaying no image on the input surface when the height of the target is greater than a first height, displaying a first image on the input surface when the height of the target is less than the first height but not touching the input surface, and displaying a second image on the input surface when the target touches the input surface,
wherein in a process of said generating, the information on said target to which information said height information is added is generated, and in a process of said performing, predetermined processing is performed on a basis of said height information added to the information on said target.

9. An input device having an input unit for receiving light corresponding to an external input, and allowing input to a plurality of points on an input surface of said input unit, said input device comprising:
a target creating section configured to generate information on a target indicating a series of external inputs on a basis of temporal or spatial positional relation of input parts to which the inputs have been performed;
a display section configured to display an image, the display means corresponding to said input surface of said input unit;
a performing section configured to perform predetermined processing on a basis of the information on said target; and
a height information generating section configured to generate height information indicating height of said target from said input surface on a basis of an amount of light received in said input unit;
wherein said target creating section generates the information on said target to which information said height information is added, and said performing section performs predetermined processing on a basis of said height information added to the information on said target, and the display section does not display any image when the height of the target is greater than a first height, displays a first image when the height of the target is less than the first height but not touching the display section, and displays a second image when the target touches the display section.

10. The input device according to claim 9, wherein the display section displays said first image including selectable menu icons, and the display section displays the second image including the selectable menu icons and indicates a selectable menu icon that is being touched by the target.

* * * * *